United States Patent
Lamb

(10) Patent No.: US 10,529,182 B2
(45) Date of Patent: Jan. 7, 2020

(54) SYSTEMS AND METHODS FOR OVERRIDING GAMING RESULTS

(71) Applicant: KING SHOW GAMES, INC., Minnetonka, MN (US)

(72) Inventor: Jacob Lamb, Maple Grove, MN (US)

(*) Notice: Subject to any disclaimer, the term of this patent is extended or adjusted under 35 U.S.C. 154(b) by 0 days.

(21) Appl. No.: 16/031,289

(22) Filed: Jul. 10, 2018

(65) Prior Publication Data

US 2019/0043305 A1 Feb. 7, 2019

Related U.S. Application Data

(60) Provisional application No. 62/540,742, filed on Aug. 3, 2017.

(51) Int. Cl.
*G07F 17/32* (2006.01)
*G06F 17/18* (2006.01)
*G07F 17/34* (2006.01)

(52) U.S. Cl.
CPC .......... *G07F 17/3234* (2013.01); *G06F 17/18* (2013.01); *G07F 17/3262* (2013.01); *G07F 17/34* (2013.01)

(58) Field of Classification Search
USPC .......................................... 463/20
See application file for complete search history.

(56) References Cited

U.S. PATENT DOCUMENTS

| | | | |
|---|---|---|---|
| 6,506,117 B2 * | 1/2003 | DeMar | G07F 17/32 273/138.2 |
| 8,235,800 B2 | 8/2012 | Gingher | |
| 2002/0142823 A1 * | 10/2002 | DeMar | G07F 17/32 463/16 |
| 2003/0199307 A1 * | 10/2003 | DeMar | G07F 17/32 463/20 |
| 2008/0132324 A1 | 6/2008 | Toyoda | |
| 2015/0269809 A1 | 9/2015 | Smith | |

* cited by examiner

*Primary Examiner* — Pierre E Elisca

(57) ABSTRACT

Systems, apparatuses and methods for overriding gaming results, to provide particular gaming awards or payouts more often than the natural odds of such particular gaming awards/payouts may otherwise statistically allow. A particular gaming event has a natural probability of occurring during game play, and a separate random event may be established to cause the particular gaming event outcome to occur more frequently than the particular gaming event would occur naturally. If the separate random event occurs, the particular gaming event is forced to occur even though it may not have otherwise occurred.

20 Claims, 13 Drawing Sheets

SYSTEMS AND METHODS FOR OVERRIDING GAMING RESULTS

FIELD

This disclosure relates generally to games, and more particularly to systems, apparatuses and methods for providing particular gaming awards more frequently than their natural odds would otherwise provide.

BACKGROUND

Casino games such as poker, slots, and craps have long been enjoyed as a means of entertainment. Some of these games originated using traditional elements such as playing cards or dice. More recently, gaming devices have been developed to simulate and/or further enhance these games while remaining entertaining. The popularity of casino gambling with wagering continues to increase, as does recreational gambling such as non-wagering computer game gambling. Part of this popularity is due to the increased development of new types of games that are implemented, at least in part, on gaming devices.

One reason that casino games are widely developed for gaming devices is that a wide variety of games can be implemented on gaming devices, thereby providing an array of choices for players looking to gamble. For example, the graphics and sounds included in such games can be modified to reflect popular subjects, such as movies and television shows. Game play rules and types of games can also vary greatly providing many different styles of gambling. Additionally, gaming devices require minimal supervision to operate on a casino floor, or in other gambling environments. That is, as compared to traditional casino games that require a dealer, banker, stickman, pit managers, etc., gaming devices need much less employee attention to operate.

With the ability to provide new content, players have come to expect the availability of an ever wider selection of new games when visiting casinos and other gaming venues. Playing new games adds to the excitement of "gaming." As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill, although some skill may be an element in some types of games. Since random chance is a significant component of these games, they are sometimes referred to as "games of chance."

The present disclosure describes systems, apparatuses and methods that facilitate new and interesting gaming experiences, and provide advantages over the prior art.

SUMMARY

The present disclosure is directed to systems, apparatuses, computer-readable media, and/or methods that are configured to provide particular gaming awards or payouts more often than the natural odds of such particular gaming awards/payouts would otherwise statistically allow.

In one embodiment, a gaming method is provided that includes identifying a gaming result having a first probability of occurrence when conducting a gaming event, establishing a random event having a second probability of occurrence that is greater than the first probability of occurrence, determining whether the identified gaming result occurs naturally as a result of conducting the gaming event, and awarding a payout associated with the identified gaming result if the established random event occurs.

In some embodiments of such a method, the random event is established to have a second probability of occurrence that is not greater than the first probability of occurrence of the gaming result. In such embodiments, even where the second probability of the random event is not greater than the first probability of the gaming result, the collective probability of either the gaming result or random event occurring is greater than the first probability of the gaming result.

According to more particular embodiments, such a method may further include awarding the payout associated with the identified gaming result if either the established random event occurs or the identified gaming result occurs naturally as a result of conducting the gaming event. In another embodiment, the method further involves awarding the payout associated with the identified gaining result if the random event occurs before the identified gaming result occurs naturally. In another embodiment, determining whether the identified gaming result occurs naturally involves determining whether a predefined pattern of game indicia occurs as a result of conducting the gaming event.

In another embodiment of such a method, determining whether the identified gaming result occurs naturally involves determining whether two or more independent gaming outcomes concurrently occur. More particular embodiments involve determining whether a predefined pattern of game indicia occurs as a result of conducting the gaming event, and determining whether a payout modifier occurs as a result of conducting the gaming event.

In another embodiment, a slot game device/machine is provided on which players can play slot games. The representative slot game device includes at least a display presenting a slot game grid, a user interface including at least one user input to enable a player to initiate a slot game event presented via the slot game grid, and a wager input device structured to identify and validate player assets and ultimately permit the player to play the slot game event when the player assets are provided. The slot game device also includes a processor configured to establish multiple symbol combinations, each having respective payouts when occurring in connection with the slot game event. At least one payout modifier is established, where the payout modifier is capable of enhancing the payouts when it is associated with a payout. At least a first symbol combination and at least one of the payout modifiers are established as a game result that has a first probability of occurrence. An unrelated random event is also established that has a second probability of occurrence that is, in some embodiments, greater than the first probability of occurrence. The representative method further includes determining whether the random event occurs in connection with the slot game event, and forcing the game result to occur if the random event occurs.

In some embodiments of such a slot game, the unrelated random event is established to have a second probability of occurrence that is not greater than the first probability of occurrence of the game result. In such embodiments, even where the second probability of the unrelated random event is not greater than the first probability of the game result, the collective probability of either the game result or random event occurring is greater than the first probability of the game result.

Another embodiment involves a gaining device that can provide a more guaranteed override feature than one that utilizes a second statistical probability greater than the statistical probability of the natural gaming result occurring.

In this embodiment, the gaming device includes a display to present one or more gaming events, a user interface including at least one user input to enable a player to initiate the gaming events, a wager input device structured to identify and validate player assets used to participate in the gaming events, and a processor. In this representative embodiment, the processor is configured to identify a particular gaining result that would statistically occur within a first number of plays of the gaming events, and to specify a second number of plays of the gaming events that is less than the first number of plays of the gaining events in which the particular gaming result would statistically occur. A counter is adjusted on each occurrence of the gaming events, and when the counter reaches the second number of plays of the gaming events, the particular gaining result is forced to occur as if the particular gaming result had occurred by chance within the first number of plays of the gaming events. In another embodiment, the particular gaming result is provided with a high probability of occurrence, so that while it is not "forced" in connection with participation in a gaming event, it is made more probably, or in some cases highly probable, so that it is statistically likely to occur within a desired estimated number of gaming events.

In more particular embodiments of such a gaming device, the processor may be further configured to establish a random event that would statistically occur within a third number of plays of the gaming events, where the third number is less than the first number of plays of the gaming events. It is then determined whether the random event occurs in connection with each of the gaming events, and if it does, the particular gaming result is forced to occur (or provided with an increased probability of occurring) as if the particular gaining result had occurred by chance within the first number of plays of the gaming events. In one embodiment, the specified second number is substantially the same as the third number of plays of the gaming events, so that the particular gaming result can occur in connection with any gaming event among the second/third number gaming event plays, and if it does not randomly occur during those plays, the particular gaining event can be forced at/near the second/third number of gaming event plays due to the counter reaching the second/third number. In another embodiment, the particular gaming result is forced if either the counter reaches the second number of plays of the gaming events or if the random event occurs.

In another particular embodiment of such a gaming device, the processor is configured to adjust the counter by incrementing the counter towards a count value corresponding to the specified second number of plays each time another of the gaming events occurs. Alternatively, the processor may be configured to adjust the counter by decrementing the counter from a count value corresponding to the specified second number of plays each time another of the gaining events occurs.

In still other embodiments of such a gaining device, the processor is configured to reset the counter in response to the particular gaming result being forced to occur. In another embodiment, the processor is configured to reset the counter in response to the particular gaming result occurring by chance within the first number of plays of the gaming events.

In another particular embodiment of such a gaming device, the processor is configured to specify a second number of plays of the gaming events that is greater than (or equal to in still other embodiments) the first number of plays of the gaming events in which the particular gaming result would statistically occur. The counter is similarly adjusted on each occurrence of the gaming events, and when the counter reaches the second number of plays of the gaming events, the particular gaming result is forced to occur as if the particular gaming result had occurred by chance. In some embodiments, the particular gaming result may occur if it occurs naturally or as a result of the counter reaching a threshold condition, whereby the combination of the natural occurrence or the counter-based occurrence causes the overall probability of a payout for the particular gaming result to improve, whether the second number of plays of the gaming events is less than or greater than the first number of plays.

Another embodiment involves a method that can provide a more guaranteed override feature than that which utilizes a random event with a more favorable statistical probability, than that of the natural gaming result. Such a method involves identifying a particular gaming result that would statistically occur within a first number of plays of the gaming events, and specifying a second number of plays of the gaming events that is less than the first number of plays of the gaming events in which the particular gaming result would statistically occur. A counter is adjusted on each occurrence of the gaming events, and when the counter reaches the second number of plays of the gaming events, the particular gaming result is forced to occur as if the particular gaining result had occurred by chance within the first number of plays of the gaming events.

In another embodiment of such a method, specifying the second number of plays of the gaming events may not be less than the first number of plays of the gaming events in which the particular gaming result would statistically occur. For example, in such an embodiment, the second number of plays may be greater than the first number of plays, but may still occur before the particular gaming result statistically occurs within the first number of plays of the gaining events.

A more particular embodiment of such a method includes establishing a random event that would statistically occur within a third number of plays of the gaming events, where the third number is, in some embodiments, also less than the first number of plays of the gaming events. It is determined whether the random event occurs in connection with any of the gaming events, and if so, the particular gaming result is forced to occur as if the particular gaming result had occurred by chance within the first number of plays of the gaming events. In a more particular embodiment, the counter is reset in response to forcing the particular gaming result when the random event occurs. In still other embodiments, the third number may not be less than the first number of plays of the gaming events, yet the collective probability of the particular gaming event occurring as a result of it occurring naturally within the first number of plays of the gaming events, or due to the occurrence of the random event via either the second or third number of plays of the gaming events, results in the particular gaming event occurring statistically more often than if the particular gaming event was left to its own first probability of occurring.

Another embodiment relates to a method for providing a slot game. Such a method includes establishing multiple symbol combinations each having respective payouts when occurring in connection with a slot game event, establishing at least one payout modifier capable of enhancing the payouts when associated with the payouts, establishing a symbol combination(s) and a payout modifier(s) as a game result having a first probability of occurrence, and establishing a random event having a second probability of occurrence that is greater than the first probability of occurrence. Such a method involves facilitating play in the slot game event where the game result may occur within the first probability of occurrence, and forcing the game result to occur if the random event occurs. In a more particular embodiment, the slot game event involves spinning the slot game reels to rearrange the symbols on a slot game grid.

Another representative gaming method includes identifying a particular gaming result that would statistically occur at a first probability, specifying a randomly selectable event having a second probability that is more probable than the first probability, determining if the randomly selectable event occurs in connection with a gaming event; and if the randomly selectable event occurs in connection with the gaming event, forcing the gaming event to produce the particular gaming result.

In another embodiment, a gaming method is provided that includes identifying a gaming result having a natural probability of occurring when conducting a gaming event naturally, and having a designated probability of occurring when selected from a bank of predefined outcomes. A random selection is made between identifying the gaming result by conducting the gaming event naturally or by selecting from the bank of predefined outcomes. If the randomly selecting indicates to select from the bank of predefined outcomes, at least one of the predefined outcomes is selected from the bank of predefined outcomes. A payout associated with the identified gaining result is awarded if it occurs naturally, or if the random selection indicates to select from the bank of predefined outcomes and the identified gaming result is selected among the bank of predefined outcomes.

In other embodiments of such a method, the random selection involves randomly selecting between the gaming result by conducting the gaming event naturally or by selecting from the bank of predefined outcomes based on a fixed weighting. In another embodiment, the random selection involves randomly selecting between the gaming result by conducting the gaming event naturally or by selecting from the bank of predefined outcomes based on a dynamic weighting that increasingly favors the selecting from the bank of predefined outcomes as the gaming events are played. In another embodiment, the natural probability of the gaming result occurring is lower than the designated probability of the gaming result occurring.

In accordance with another embodiment, a slot game device is provided that includes at least a display, a user interface, a wager input device, and a processor. The display presents a slot game grid, the user interface includes at least one user input to enable a player to initiate a slot game event presented via the slot game grid, the wager input device is structured to identify and validate player assets and to permit the player to play the slot game event when the player assets are provided. The processor is configured to identify a gaming result having a first probability of occurrence when conducting a gaming event, establish a random event having a second probability of occurrence, determine whether the identified gaming result occurs naturally as a result of conducting the gaming event, and award a payout associated with the identified gaming result if the established random event occurs.

In more particular embodiments of such a slot game device, the processor is configured to establish the random event to have the second probability of occurrence greater than the first probability of occurrence. In another particular embodiment, the processor is configured to establish the random event such that the second probability of occurrence is not greater than the first probability of occurrence, and to establish an overall probability of awarding the payout (based on either the gaining result or the random event occurring) that is greater than the first probability of the gaming result occurring.

In accordance with yet another embodiment, a gaming device is provided that includes a display to present one or more gaming events, a user interface including at least one user input to enable a player to initiate and participate in the gaming events, a wager input device structured to identify and validate player assets used to participate in the gaming events, and a processor. The processor is configured to identify a gaming result having a natural probability of occurring when conducting a gaining event naturally, and having a designated probability of occurring when selected from a bank of predefined outcomes. The processor is further configured to randomly select between identifying the gaming result by conducting the gaming event naturally or by selecting from the bank of predefined outcomes. If the random selection indicates to select from the bank of predefined outcomes, the processor is configured to select one of the predefined outcomes from the bank of predefined outcomes. The processor is further configured to award a payout associated with the identified gaming result if it occurs naturally, or if the random selection indicates to select from the bank of predefined outcomes and the identified gaming result is selected among the bank of predefined outcomes.

This summary serves as an abbreviated, selective introduction of a representative subset of various concepts and embodiments that are further described or taught to those skilled in the art in the Specification herein. This summary is not intended to refer to all embodiments, scopes, or breadths of claims otherwise supported by the Specification, nor to identify essential features of the claimed subject matter, nor to limit the scope of the claimed subject matter.

DETAILED DESCRIPTION

Figure 1:
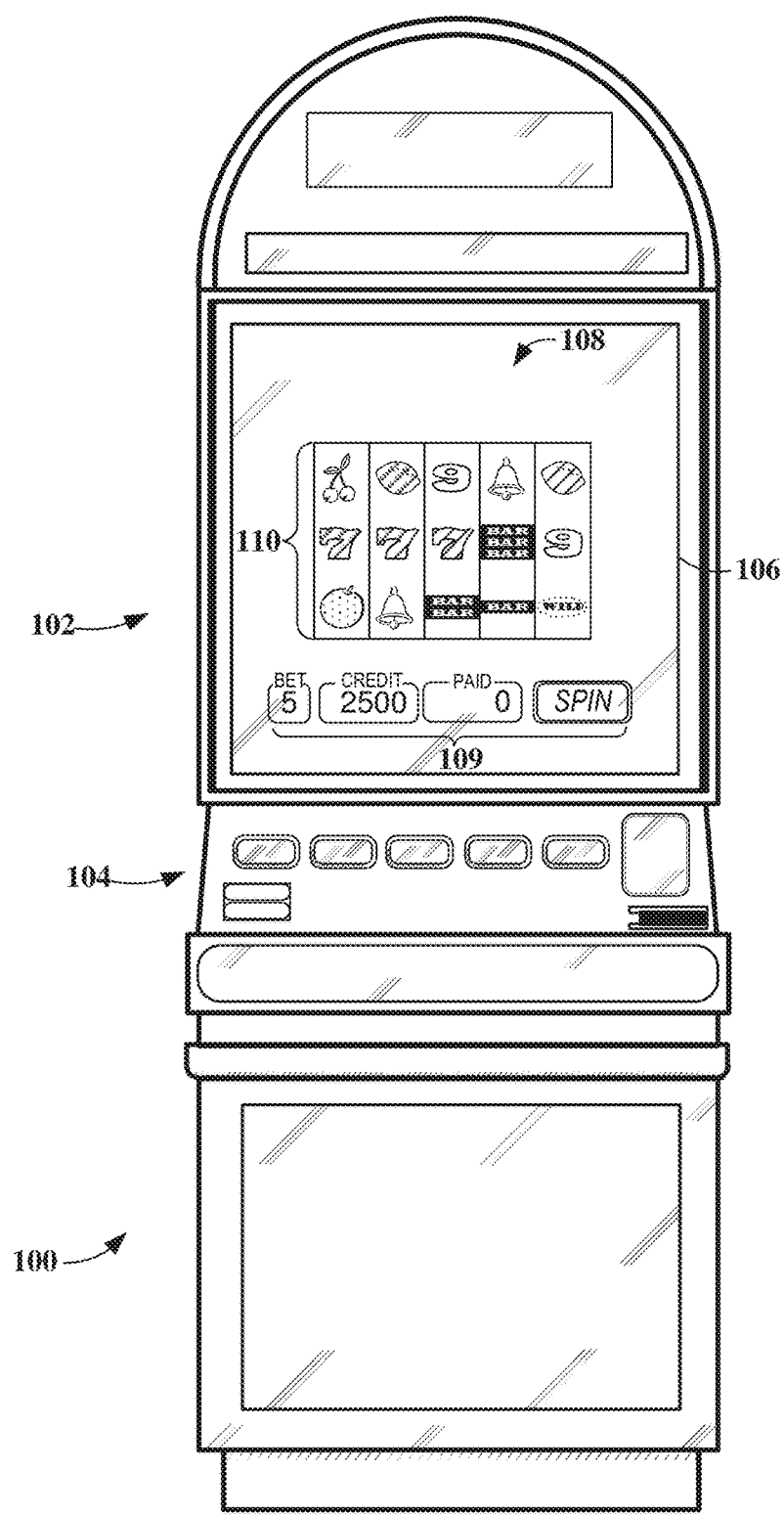
FIG. 1 is a diagram of a representative gaming machine capable of facilitating player use and interaction with games and features in accordance with the invention and representative embodiments described herein.

In the following description of various exemplary embodiments, reference is made to the accompanying drawings which form a part hereof, and in which is shown by way of illustration representative embodiments in which the features described herein may be practiced. It is to be understood that other embodiments may be utilized, as structural and operational changes may be made without departing from the scope of the disclosure.

In the description that follows, the terms "reels," "cards," "decks," and similar mechanically descriptive language may be used to describe various apparatus presentation features, as well as various actions occurring to those objects (e.g., "spin," "draw," "hold," "bet"). Although the present disclosure may be applicable to manual, mechanical, and/or computerized embodiments, as well as any combination therebetween, the use of mechanically descriptive terms is not meant to be only applicable to mechanical embodiments. Those skilled in the art will understand that, for purposes of providing gaming experiences to players, mechanical elements such as cards, reels, and the like may be simulated on a display in order to provide a familiar and satisfying experience that emulates the behavior of mechanical objects, as well as emulating actions that occur in the non-computerized games (e.g., spinning, holding, drawing, betting). Further, the computerized version may provide the look of mechanical equivalents but may be generally randomized in a different way. Thus, the terms "cards," "decks," "reels," "hands," etc., are intended to describe both physical objects and emulation or simulations of those objects and their behaviors using electronic apparatuses.

In various embodiments, the gaming displays are described in conjunction with the use of data in the form of "symbols." In the context of this disclosure, a "symbol" may generally refer at least to a collection of one or more arbitrary indicia or signs that have some conventional or defined significance. In particular, the symbol may represent values that can at least be used to determine whether to award a payout. A symbol may include numbers, letters, shapes, pictures, textures, colors, sounds, etc., and any combination therebetween. A play state, such as a win, can be determined by comparing the symbol with one or more other symbols. Such comparisons can be performed, for example, via software by mapping numbers (or other data structures such as character strings) to the symbols and performing the comparisons on the numbers/data structures. Other conventions associated with known games (e.g., the numerical value/ordering of face cards and aces in card games) may also be programmatically analyzed to determine winning combinations.

Generally, systems, apparatuses and methods are described for providing particular gaining awards more frequently than their natural odds would otherwise provide. The systems, apparatuses and methods described herein may be implemented as a single game, or part of a multi-part game. For example, the game features described herein may be implemented in primary gaming activities, bonus games, side bet games or other secondary games associated with a primary gaming activity. The game features may be implemented in stand-alone games, multi-player games, etc. Further, the disclosure may be applied to games of chance, and descriptions provided in the context of any representative game (e.g. slot game) is provided for purposes of facilitating an understanding of the features described herein. However, the principles described herein are equally applicable to any game of chance where an outcome(s) is determined for use in the player's gaming activity.

Embodiments of the present concept include providing gaming devices (also referred to as gaming apparatuses or gaming machines), gaming systems, and methods of operating these devices or systems to provide game play that involves establishing and monitoring whether a random event occurs by chance more frequently and/or at a different probability than that of certain gaming outcome(s). If a particular gaming outcome(s) is desired to occur more frequently than its natural statistical probability would allow, then such a separate, random event(s) can be used to set the probability of occurrence where desired. If the random event occurs in view of these more favorable odds, the gaming outcome can be forced to occur, where it may not have otherwise occurred due to the less favorable odds associated with only the natural probability of the particular gaming outcome(s).

In various embodiments, the random event(s) may be created to statistically occur more, less, or the same frequency as the natural, statistical probability of occurrence of the particular gaming outcome, yet the overall likelihood of the particular gaming outcome will increase in view of the possibility of either the particular gaming outcome occurring naturally or as a result of the random event occurring.

Numerous variations are possible in view of these and other embodiments of the inventive concept. Representative embodiments and variations are described herein, with some embodiments described with reference to the drawings. However, many other embodiments and variations exist that are covered by the principles and scope of this concept. For example, although some of the embodiments discussed below involve reel-based slot machine examples of this concept, other embodiments include application of these inventive techniques in other types of slot games, poker games, roulette, bingo, or other games of chance. Some of these other types of embodiments will be discussed below as variations to the examples illustrated. However, many other types of games can implement similar techniques and fall within the scope of this disclosed concept.

Referring to the example gaming apparatus 100 shown in FIG. 1, the representative gaming apparatus includes at least a display area(s) 102 (also referred to as a gaming display), and a player interface area(s) 104, although some or all of the interactive mechanisms included in the user interface area 104 may be provided via other or additional means, such as graphical icons used with a touch screen in the display area 102 in some embodiments. The display area 102 may include one or more game displays 106 (also referred to as "displays" or "gaming displays") that may be included in physically separate displays or as portions of a common large display. Here, the representative game display 106 includes at least a primary game play portion 108 that displays game elements and symbols 110, and an operations portion 109 that can include meters, various game buttons and other input mechanisms, and/or other game information for a player of the gaming device 100.

The user interface 104 allows the user to control, engage in play of, and otherwise interact with the gaming machine 100. The particular user interface mechanisms included with user interface 104 may be dependent on the type of gaming device. For example, the user interface 104 may include one or more buttons, switches, joysticks, levers, pull-down handles, trackballs, voice-activated input, touchscreen input, tactile input, and/or any other user input system or mechanism that allows the user to play and interact with the particular gaming activity.

The user interface 104 may allow the user or player to enter coins, bills, or otherwise obtain credits through vouchers, tokens, credit cards, tickets, electronic money, etc. Various mechanisms for entering such vouchers, tokens, credit cards, coins, tickets, etc. are described below with reference to FIG. 2. For example, currency input mechanisms, card readers, credit card readers, smart card readers, punch card readers, radio frequency identifier (RFID) readers, and other mechanisms may be used to enter wagers. The user interface 104 may also include a mechanism to read and/or validate player information, such as player loyalty information to identify a user or player of the gaming device. This mechanism may be, for example, a card reader, biometric scanner, keypad, or other input device. It is through a user interface such as the user interface 104 that the player can initiate and engage in gaming activities. While the illustrated embodiment depicts various buttons for the user interface 104, it should be recognized that a wide variety of user interface options are available for use in connection with the present invention, including pressing buttons, touching a segment of a touch-screen, entering text, entering voice commands, or other known data entry methodology.

The game display 106 in the display area 102 may include one or more of an electronic display, a video display, a mechanical display, and fixed display information, such as pay table information associated with a glass/plastic panel(s) on the gaming machine 100 and/or graphical images. The symbols or other indicia associated with the play of the game may be presented on an electronic display device or on mechanical devices associated with a mechanical display. Generally, in some embodiments, the display 106 devotes the largest portion of viewable area to the primary gaming portion 108. The primary gaming portion 108 may provide visual feedback to the user for any selected game. The primary gaming portion 108 may render graphical objects such as cards, slot reels, dice, animated characters, and any other gaming visual known in the art. The primary gaming portion 108 may also inform players of the outcome of any particular event, including whether the event resulted in a win or loss.

In some example embodiments illustrated herein, the primary gaming portion 108 may display a grid (or equivalent arrangement) of game elements 110 or game element positions (also referred to herein as "reel stop positions"). As illustrated in the embodiment shown in FIG. 1, the grid includes three rows and five columns of game elements 110, which may form a game outcome(s) of a game play event from which prizes are determined. In some slot machine examples, each column may display a portion of a game reel. The game reels may include a combination of game symbols in a predefined order. In mechanical examples, the game reels may include physical reel strips where game symbols are shown in images fixed on the reel strips. Virtual reel strips may be mapped to these physical reel positions shown on the reel strips to expand the range or diversity of game outcomes. In video slot examples, reel strips may be encoded in a memory or database and virtual reels may be used for the game reels with images representing the data related to the reel strips. In other slot machine embodiments, each reel stop position on the grid may be associated with an independent reel strip. In yet other slot machine embodiments, reels and/or reel strips may not be used at all in determining the symbols shown in the game element positions of the grid. For example, a symbol may be randomly selected for each game element position, or the symbols may be determined in part by game events occurring during game play, such as displayed elements being replaced by new game elements or symbols. Numerous variations are possible for implementing slot-type game play.

The primary gaming portion 108 may include other features known in the art that facilitate gaming, such as status and control portion 109. As is generally known in the art, this portion 109 provides information about current bets, current wins, remaining credits, etc. associated with gaming activities of the grid of game elements 110. The control portion 109 may also provide touchscreen controls for facilitating game play. The grid of game elements 110 may also include touchscreen features, such as facilitating selection of individual symbols, or user controls over stopping or spinning reels. The game display 106 of the display area 102 may include other features that are not shown, such as pay tables, navigation controls, etc.

Figure 2:
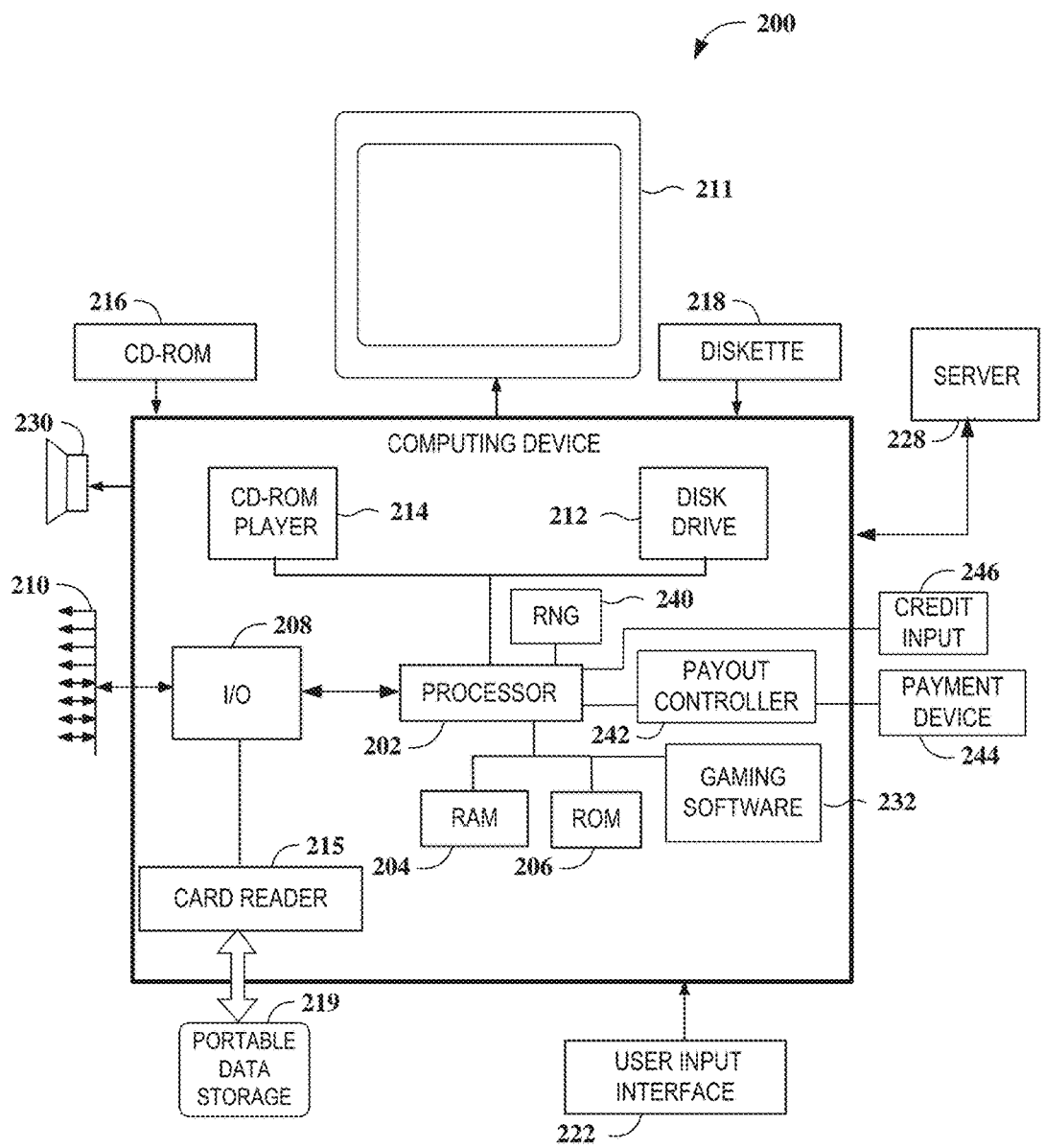
FIG. 2 is a block diagram illustrating a representative computing arrangement capable of implementing games and features in accordance with the invention and representative embodiments described herein.

Although FIG. 1 illustrates a particular implementation of some of the embodiments of this invention in a casino or electronic gaming machine ("EGM") one or more devices may be programmed to play various embodiments of the invention. The concepts and embodiments described herein may be implemented, as shown in FIG. 1, as a casino gaming machine or other special purpose gaming kiosk as described herein, or may be implemented via computing systems operating under the direction of local gaming software, and/or remotely-provided software such as provided by an application service provider (ASP). Casino gaming machines may also utilize computing systems to control and manage the gaming activity, although these computing systems typically include specialized components and/or functionality to operate the particular elements of casino gaming machines. Additionally, computing systems operating over networks, such as the Internet, may also include specialized components and/or functionality to operate elements particular to these systems, such as random number generators. An example of a representative computing system capable of carrying out operations in accordance with the principles described herein is illustrated in FIG. 2.

Hardware, firmware, software or any combination thereof may be used to perform the various gaming functions, display presentations and operations described herein. The functional modules used in connection with the disclosure may reside in a gaming machine as described, or may alternatively reside on a stand-alone or networked computer. The representative computing structure 200 of FIG. 2 is an example of a computing structure that can be used in connection with such electronic gaming machines, computers, or other computer-implemented devices to carry out operations of the present invention. Although numerous components or elements are shown as part of this computing structure 200 in FIG. 2, additional or fewer components may be utilized in particular implementations of embodiments of the invention.

The example computing arrangement 200 suitable for performing the gaining functions described herein includes a processor, such as depicted by the representative central processing unit (CPU) 202, coupled to memory, such as random access memory (RAM) 204, and some variation of read-only memory (ROM) 206 or other persistent storage. The ROM 206 may also represent other types of storage media to store programs, such as programmable ROM (PROM), erasable PROM (EPROM or any technology capable of storing data). The processor 202 may communicate with other internal and external components through input/output (I/O) circuitry 208 and bussing 210, to communicate control signals, communication signals, and the like.

The computing arrangement 200 may also include one or more data storage devices, including hard and floppy disk drives 212, CD-ROM drives 214, card reader 215, and other hardware capable of reading and/or storing information such as DVD, etc. In one embodiment, software for carrying out the operations in accordance with the present invention may be stored and distributed on a CD-ROM 216, diskette 218, access card 219, or other form of computer readable media capable of portably storing information. These storage media may be inserted into, and read by, devices such as the CD-ROM drive 214, the disk drive 212, card reader 215, etc. The software may also be transmitted to the computing arrangement 200 via data signals, such as being downloaded electronically via a network, such as local area network (casino, property, or bank network) or a wide area network (e.g., the Internet). Further, as previously described, the software for carrying out the functions associated with the present invention may alternatively be stored in internal memory/storage of the computing device 200, such as in the ROM 206.

The computing arrangement 200 is coupled to one or more displays 211, which represent a manner in which the gaming activities may be presented. The display 211 represents the "presentation" of the game information in accordance with the disclosure, and may be a mechanical display showing physical spinning reels, a video display, such as liquid crystal displays, plasma displays, cathode ray tubes (CRT), digital light processing (DLP) displays, liquid crystal on silicon (LCOS) displays, etc., or any type of known display or presentation screen.

Where the computing device 200 represents a stand-alone or networked computer, the display 211 may represent a standard computer terminal or display capable of displaying multiple windows, frames, etc. Where the computing device 200 represents a mobile electronic device, the display 211 may represent the video display of the mobile electronic device. Where the computing device 200 is embedded within an electronic gaming machine, the display 211 corresponds to the display screen of the gaming machine/kiosk.

A user input interface 222 such as a mouse, keyboard/keypad, microphone, touch pad, trackball, joystick, touch screen, voice-recognition system, card reader, biometric scanner, RFID detector, etc. may be provided. The user input interface 222 may be used to input commands in the computing arrangement 200, such as placing wagers or initiating gaming events on the computing arrangement 200, inputting currency or other payment information to establish a credit amount or wager amount, inputting data to identify a player for a player loyalty system, etc. The display 211 may also act as a user input device, e.g., where the display 211 is a touchscreen device. In embodiments, where the computing device 200 is implemented in a personal computer, tablet, smart phone, or other consumer electronic device, the user interface and display may be the available input/output mechanisms related to those devices.

Chance-based gaming systems such as slot machines, in which the present invention is applicable, are governed by random numbers and processors, as facilitated by a random number generator (RNG) or other random generator. The fixed and dynamic symbols generated as part of a gaming activity may be produced using one or more RNGs. RNGs may be implemented using hardware, software operable in connection with the processor 202, or some combination of hardware and software. The principles described herein are operable using any known RNG, and may be integrally programmed as part of the processor 202 operation, or alternatively may be a separate RNG controller 240 that may be associated with the computing arrangement 200 or otherwise accessible such as via a network. The RNGs are often protected by one or more security measures to prevent tampering, such as by using secured circuitry, locks on the physical game cabinet, and/or remote circuitry that transmits data to the gaming device.

The computing arrangement 200 may be connected to other computing devices or gaming machines, such as via a network. The computing arrangement 200 may be connected to a network server(s) 228 in an intranet or local network configuration. The computer may further be part of a larger network configuration as in a global area network (GAN) such as the Internet. In such a case, the computer may have access to one or more web servers via the Internet. In other arrangements, the computing arrangement 200 may be configured as an Internet server and software for carrying out the operations in accordance with the present invention may interact with the player via one or more networks. The computing arrangement 200 may also be operable over a social network or other network environment that may or may not regulate the wagering and/or gaming activity associated with gaming events played on the computing arrangement.

Other components directed to gaming machine implementations include manners of gaming participant payment, and gaming machine payout. For example, a gaming machine including the computing arrangement 200 may also include a payout controller 242 to receive a signal from the processor 202 or other processor(s) indicating a payout is to made to a player and controlling a payout device 244 to facilitate payment of the payout to the player. In some embodiments, the payout controller 242 may independently determine the amount of payout to be provided to the participant or player. In other embodiments, the payout controller 242 may be integrally implemented with the processor 202. The payout controller 242 may be a hopper controller, a print driver, credit-transmitting device, bill-dispensing controller, accounting software, or other controller device configured to verify and/or facilitate payment to a player.

A payout or payment device 244 may also be provided in gaming machine embodiments, where the payment device 244 serves as the mechanism providing the payout to the player or participant. In some embodiments, the payment device 244 may be a hopper, where the hopper serves as the mechanism holding the coins/tokens of the machine, and/or distributing the coins/tokens to the player in response to a signal from the payout controller 242. In other embodiments, the payout device 244 may be a printer mechanism structured to print credit-based tickets that may be redeemed by the player for cash, credit, or other casino value-based currency or asset. In yet other embodiments, the payout device 244 may send a signal via the network server 228 or other device to electronically provide a credit amount to an account associated with the player, such as a credit card account or player loyalty account. The computing arrangement 200 may also include accounting data stored in one of the memory devices 204, 206. This accounting data may be transmitted to a casino accounting network or other network to manage accounting statistics for the computing arrangement or to provide verification data for the currency or currency-based tickets distributed by the payout device, such as providing the data associated with the bar codes printed on the currency-based tickets so they are identifiable as valid tickets for a particular amount when the player redeems them or inserts them in another gaming device.

The wager input module or device 246 represents any mechanism for accepting coins, tokens, coupons, bills, electronic fund transfer (EFT), tickets, credit cards, smart cards, membership/loyalty cards, or any other player assets, for which a participant inputs a wager amount. The wager input device 246 may include magnetic strip readers, bar code scanners, light sensors, or other detection devices to identify and validate physical currency, currency-based tickets, cards with magnetized-strips, or other medium inputted into the wager input device. When a particular medium is received in the wager input device 246, a signal may be generated to establish or increase an available credit amount or balance stored in the internal memory/storage of the computing device 200, such as in the RAM 204. Thereafter, specific wagers placed on games may reduce the available credit amount, while awards won may increase the available credit amount. It will be appreciated that the primary gaming software 232 may be able to control payouts via the payment device 244 and payout controller 242 for independently determined payout events.

Among other functions, the computing arrangement 200 provides an interactive experience to players via an input interface 222 and output devices, such as the display 211, speaker 230, etc. These experiences are generally controlled by gaming software 232 that controls a primary gaining activity of the computing arrangement 200. The gaining software 232 may be temporarily loaded into RAM 204, and may be stored locally using any combination of ROM 206, drives 212, media player 214, or other computer-readable storage media known in the art. The primary gaming software 232 may also be accessed remotely, such as via the server 228 or the Internet.

The primary gaming software 232 in the computing arrangement 200 may be an application software module. According to embodiments of the present invention, this software 232 provides a slot game or similar game of chance as described herein. For example, the software 232 may present, by way of the display 211, representations of symbols to map or otherwise display as part of a slot based game having reels. However, in other embodiments, the principles of this concept may be applied to poker games or other types of games of chance. One or more aligned positions of these game elements may be evaluated to determine awards based on a pay table. The software 232 may include instructions to provide other functionality as known in the art or as described and shown herein.

The systems, apparatuses and methods operable via these and analogous computing and gaining devices can support gaining features as described herein. In one embodiment, a particular gaming result(s) is established to have a first probability of occurrence when conducting a gaming event, and a random event having a second probability of occurrence that is greater than the first probability of occurrence is also independently established. If the gaming result occurs naturally as a result of conducting the gaming event, the player can receive its corresponding payout. Otherwise, even if the gaming result doesn't occur naturally, the payout may still be provided in the event that the random event occurs, and the random event may be configured to occur more frequently than the natural occurrence of that gaming result.

In other embodiments, the random event may have a second probability of occurrence that is not greater than the first probability of occurrence. In such embodiments, that random event may not be configured to occur more frequently than the natural occurrence of the gaming result, but the overall probability of obtaining the gaming result may be increased by the collective probabilities of the occurrence of the naturally-occurring gaming result and the occurrence of the random event. For purposes of example only, the first probability of occurrence of the particular gaming event may be 1:20,000,000, and the second probability of occurrence of the random event may be 1:100,000,000. In such case, the second probability of the random event occurring is significantly less than the first probability of the particular gaming result occurring naturally. However, the overall, collective probability of the gaming event occurring by either the particular gaming result occurring naturally or by way of the occurrence of the random event is higher than the first probability of the particular gaining result occurring naturally alone. In this example, the probability of the gaming result occurring by either its natural occurrence or by the random event occurring would be approximately 1:16,666,666, (or slightly less in the event that both the natural occurrence and the random event occurred, as a result of subtracting out the intersection of the two sets). As seen from this example, the overall, collective probability of the gaining event occurring by either the particular gaming result occurring naturally or by way of the random event occurring is 1:16,666,666, which provides a higher likelihood of the particular gaining result occurring than without the random event. This is because no matter how small the likelihood of occurrence of the random event is established to be, it can increase the overall probability of the gaming result where either the natural gaming result or the random event can cause the particular gaining result to occur.

Thus, in accordance with the disclosure, one or more random events may be established at probabilities that are greater than, less than, or equal to the natural probability of the particular gaming result occurring, which can increase the overall probability of the particular gaming result occurring where either the particular gaming result occurs naturally or the random event(s) occurs. Thus, references herein to a random event(s) having a probability(ies) relative to the natural probability of a particular gaming result represents an example only, as the principles described herein are equally applicable to random events having greater or lesser (or equal) probabilities relative to the natural probability of the particular gaming result.

Many embodiments may be described in terms of a slot game, where symbols are matched on paylines to determine payout awards. However, the principles described herein are equally applicable to other games of chance, as described herein and as will be readily apparent to those skilled in the art from the teachings herein.

Figure 3:
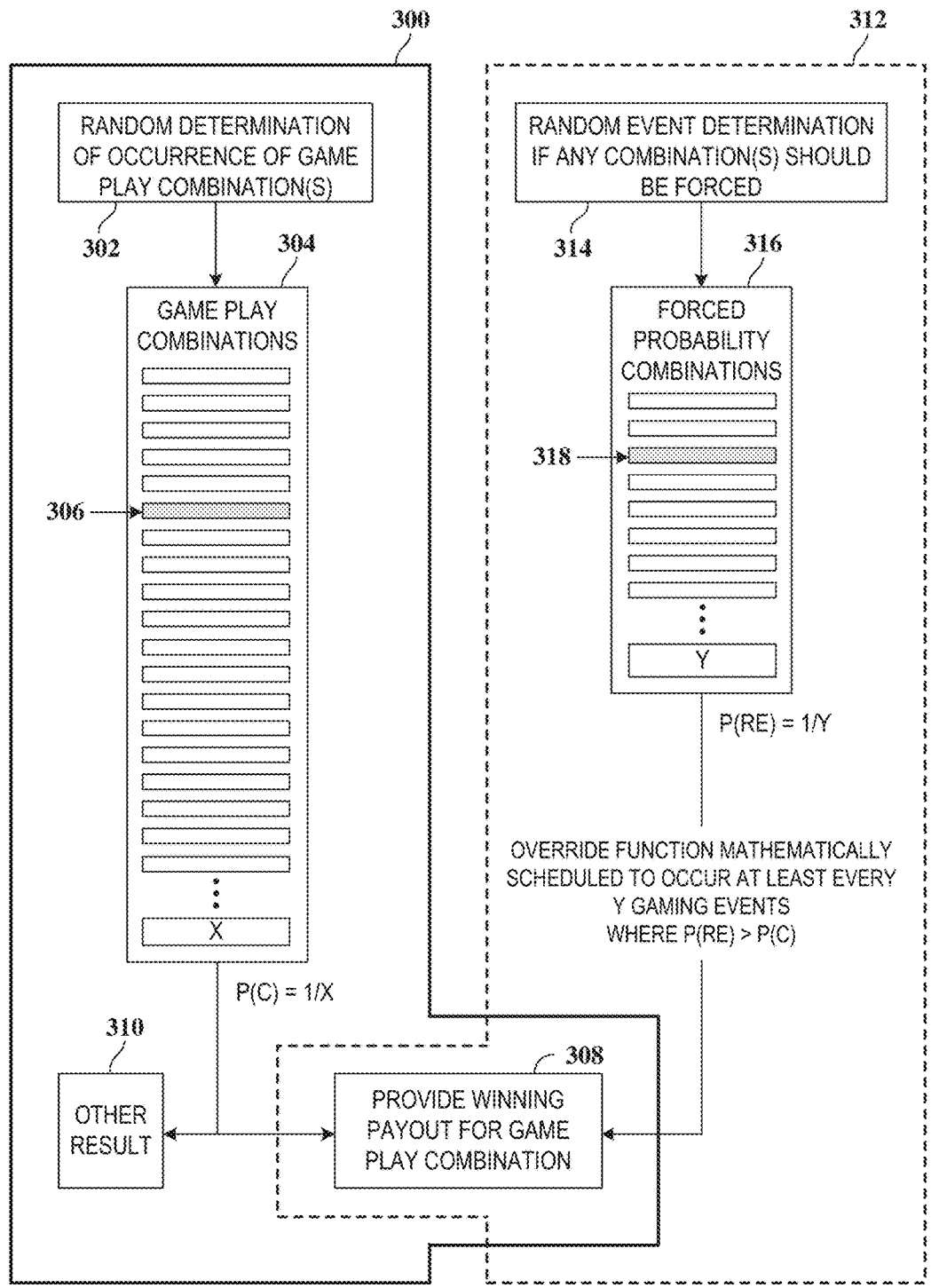
FIG. 3 is a block diagram depicting parallel activities for determining whether a particular game play combination(s) in a slot game occurs based on its natural odds, and for determining whether the particular game play combination(s) will be forced in response to occurrence of an independent random event that has different odds than the natural odds of the particular game play combination(s).

FIG. 3 is described in the context of such a slot game embodiment. This embodiment depicts parallel processes for determining whether a particular game play combination(s) occurs based on its natural odds of occurrence, and for also determining whether the particular game play combination(s) will be forced in response to occurrence of an independent random event that has different odds than the natural odds of the particular game play combination(s). Process block 300 depicts a random determination 302 of whether a particular game play combination(s) 306 occurs in response to player participation in a gaming event. The game play combinations 304 represent the various game play results that may result from participation in a gaming event, and the particular game play combination 306 represents a particular one of those game play combinations 304.

As a representative example, consider a slot game having five reels (physical, electronic, etc.), with each reel having twenty symbol locations. Assume one of the twenty symbols on each reel is a particular gaming symbol, such as a star. The odds of that star symbol from each of the five reels stopping on a particular payline is one in the number of symbol positions on each reel multiplied together. Thus, in this example with five reels and twenty symbol locations per reel, there are 3.2 million ($20^5$) game play combinations, and the chance of the sole star symbol on each of the five reels occurring on a payline is one in 3.2 million, or 1:3,200,000. In the example of FIG. 3, the game play combinations 304 represents the total number of possible game play combinations (e.g., 3.2 million in the above example), and the random selection of any one of them is depicted by a particular game play combination 306. Where X represents the total number of game play combinations, the probability (P) of a particular combination (C) occurring is one chance in X combinations, or P(C)=1/X.

As this suggests, the occurrence of some game play combinations 304 may have low statistical probabilities. Further payout enhancement features, such as the application of a payout modifier (e.g., multiplier), may further reduce the statistical probability of attaining a particular gaining result, such as a top payout award together with a payout-enhancing modifier. In other words, many interesting events in gaming activities occur when a set of independent events occur in connection with the same gaming event, such as, for example, the concurrent occurrence of a top award line pay and a randomly-generated multiplier. Game design constraints may prevent such events from occurring in connection with a common gaming event (e.g., slot game reel spin) at a frequency of occurrence desired by the game designer. For various reasons, including but not limited to high/top award odds, the game designer may wish to improve the odds of a particular gaming result that is otherwise undesirably rare from a statistical standpoint.

The present disclosure sets forth manners to ensure that one or more particular gaining events of interest occur on a desired frequency. Embodiments include statistically forcing, or in some embodiments even guaranteeing, the occurrence of particular gaming results and/or combinations at a greater frequency than its component events' individual probabilities provide for.

Returning to FIG. 3, process block 300 depicts the natural odds of a particular game play combination 306 of the X total game play combinations 304 to be 1/X. If this condition occurs, a winning payout is provided 308 for that game play combination. If the particular game play combination 306 did not occur, some other result 310 occurred which may include game play results that provide payouts and those that do not. In any event, the winning payout provided 308 for the particular game play combination may be a relatively large payout as a result of the low odds of that particular game play combination 306 occurring.

Gaming results having no payout or lower payouts will naturally occur more often than those having higher payouts. For example, a relatively large number of the particular game play combinations 306 of the available game play combinations 304 may provide the same or similar result to provide no payout or more modest payouts. On the other hand, a smaller number of the particular game play combinations 306 may provide higher winning payouts. In accordance with the present disclosure, such a winning payout may be provided 308 more frequently than the natural odds dictated by the number of gameplay combinations 304 and/or other variables impacting the frequency of occurrence.

In one embodiment a random event, independent from the random occurrence of a particular game play combination 306 among the various game play combinations 304, is used as an override function to cause the winning payout to be provided 308 at more probable odds and/or more frequently. Process block 312 generally represents a determination 314 of a random event that determines whether the particular game play combination 306 should be forced when it may not have normally occurred via process block 300. For example, the number of forced probability combinations 316 in FIG. 3 is Y, where Y<X, such that the likelihood of the random event 318 occurring among the Y forced probability combinations 316 is greater than the likelihood of the game play combination 306 occurring naturally among the X game play combinations 304. In other embodiments, Y may be greater than X, but the overall occurrence of the game play combination(s) still increases since even a random event occurring more rarely than the natural occurrence of the game play combination(s) can still increase the overall probability of that game play combination resulting from the parallel processes 300, 312.

Using the above example, if the odds of a particular game play combination 306 occurring naturally is 1:3,200,000, the forced probability combinations may be set at a lower total number of possibilities, such as 1:500,000. In such case, Y equals 500,000 such that there are 500,000 game play combinations among the available forced probability combinations 316. As the random determination 302 of occurrence of a particular game play combination 306 occurs on each gaining event (e.g., slot reel spin) to determine if it naturally occurs in X possibilities, the random event determination 314 also takes place to see if the random event occurs in Y possibilities. If the random event 318 occurs (with 1:500,000 odds in this example) occurs at block 312, the particular game play combination 306 will be forced to occur, and the winning payout for the particular game play combination 306 will be provided 308, even though it did not naturally occur. In other words, the independent process 312 may be performed as an override function that is mathematically scheduled to occur more frequently than the natural probability of a particular game play combination(s) 306, and in the present example is mathematically scheduled to occur every Y gaming events on average, where the probability (P) of occurrence of the random event (RE) is greater than the probability (P) of natural occurrence of the particular game play combination (C), or P(RE)>P(C).

In other embodiments, the probability P(RE) may be less than P(C), yet the overall probability of either the particular play combination 306 occurring naturally or the random event 318 occurring results in a higher probability of providing 308 the winning payout for that game play combination. For example, assume again that the odds of a particular game play combination 306 occurring naturally is 1:3,200,000, and in this example assume that Y equals 6,400,000 such that there is a 1:6,400,000 probability of the random event causing an override to provide 308 the winning payout. In such an example, the overall probability of providing 308 the winning payout as a result of either the game play combination 306 occurring or the random event 318 occurring would be (in this example) 1:3,200,000+1:6,400,000=3:6,400,000, or alternatively stated a probability of 1:2,133,333. This probability, 1:2,133,333, is a higher probability than the naturally occurring probability P(C) of 1:3,200,000. Thus, even though the probability P(RE) of the random event(s) may be less than the probability P(C) of occurrence of the game play combination, the probability of providing 308 the winning payout may still be increased as a result of the either the game play combination or the random event occurring. In such embodiments, even though P(RE) as an independent event may not be greater than P(C) as an independent event, the overall probability of providing 308 the payout as a result is increased, relative to the probability of the natural occurrence of the particular play combination 306, by the probability of the random event.

In some embodiments, the override feature may override any natural results with any type of override result, including winning results, non-winning results, bonuses or other play features, etc. For example, in one embodiment, the parallel process 312 may randomly select a non-winning result to use as the gaming event result. Thus, the parallel process 312 may be used to override the natural results of the normal game play process 300 regardless of what the ultimate result of the override function may be. Variations of such an embodiment are described in greater detail below.

As will be described in greater detail below, other embodiments may in fact guarantee occurrence of a particular game play combination 306 at a frequency of occurrence that is greater than the natural frequency of occurrence among the gameplay combinations 304. For example, rather than determining 314 whether the random event occurred among the forced probability combinations 316, a count value(s) may be set, and the particular game play combination 306 may be forced to occur when the number of gaming events played reaches the set count value(s). In this manner, if the particular game play combination 306 has not occurred in a number of gaming events equal to the set count value, the particular game play combination 306 will be forced to occur, or in other embodiments will still be random but at a sufficiently high probability (or an increasing probability over time or number of events played) to statistically cause the particular game play to occur within a window of play time.

Figure 4:
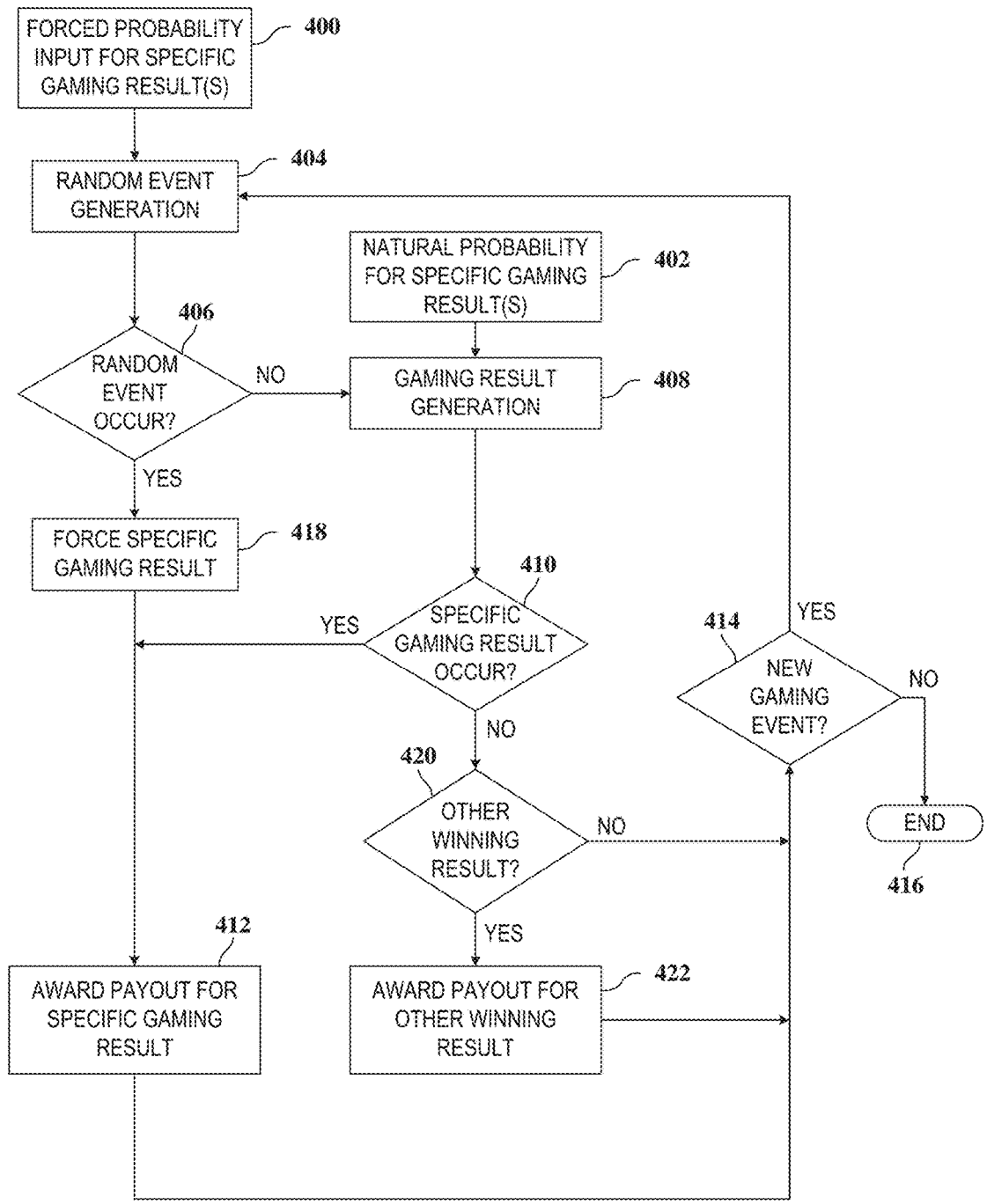
FIG. 4 is a flow diagram depicting one embodiment of a manner for overriding the natural probability of occurrence of an event or multiple events, and forcing a particular gaming result(s) more frequently than the natural probability of that particular gaming result would theoretically allow.

FIG. 4 is a flow diagram depicting one embodiment of a manner for overriding the natural probability of occurrence of an event or multiple events, and forcing a particular gaming result(s) more frequently than the natural probability of that particular gaming result would theoretically allow. In this embodiment, a determination is first made as to whether a particular game event result should be forced. More particularly, the forced probability input for the specific gaining result(s) at issue is determined as shown at block 400. For example, if the specific gaming result is desired to occur at a frequency of one in 100,000 gaming events, the forced probability input can be set to 100,000. The forced probability input could be set to a number that is higher than 100,000 and still reach the desired overall probability of awarding the particular payout associated with the specific gaming result, where the "either/or probability" of the specific gaming result(s) and the random event(s) together result in a probability of 1:100,000.

Similarly, the odds of any desired gaming outcome can be established for the game, such as the odds of one or more, or all, of the particular gaining outcomes of the game. This may be determined by the number of total possibilities and the number of instances of a particular gaining outcome within those total possibilities. For example, the odds of getting a highest payout award on a slot game may be to obtain a star symbol on each of five reels on a given payline, and the odds of that symbol combination occurring depends on the number of reels, the number of symbols per reel, the number of star symbols on each reel, etc. Other gameplay outcomes have similar outcome probabilities based on such factors. The probability of any of these game play outcomes occurring is its natural probability based on these various factors, and is depicted as the natural probability for the specific gaming results at block 402.

In accordance with the principles described herein, if the natural probability for the specific gaming result 402 does not occur often enough, the forced probability input for the specific gaming result 400 sets forth an improved probability function to override the natural gaming odds and force the specific gaming result to occur more frequently.

To accomplish this, in one embodiment, a random event is generated 404. Any desired manner of determining which of the 100,000 (or other set number) possible random outcomes has occurred is implemented. For example, a random number generator, lookup table, virtual slot reel, or any other manner of randomly selecting at least one possible outcome of the total available outcomes (100,000 in this example) may be implemented as part of the random event generation 404. If the random event does not occur 406, a gaming result, using the natural probability for the specific gaming result 402, is generated 408. If the specific gaming result occurs 410, a payout for that specific gaming result is awarded 412. If the player wants to continue with a new gaming event 414, the process returns to block 404 where the forced probability is again considered, otherwise the process ends 416. If the specific gaming result does not occur 410, and if there is no other winning result 420, play continues if the player chooses to participate in a new gaming event 414. If there is some other winning result 420 that is not the specific gaining result(s) at issue, a payout for that other winning result may be awarded 422.

On the other hand, if the random event 406 does occur, the specific gaming result is forced 418 to occur as the game play outcome. In one embodiment, the natural gaming result generation 408 does not even occur when it is determined that the random event occurred 406, while in other embodiments the natural gaming result generation 408 may still occur but the result is unused with a random event occurs 406. Forcing the specific gaming result may be accomplished in any desired manner, such as directing a stepper motor(s) to cause physical reels to stop at particular positions, directing virtual reels to present particular symbols on a particular payline, causing certain cards to be presented in card/poker embodiments, etc. Thus, if the forced probability for the specific gaming event 400 results in the random event occurring 406 (at odds that differ from the natural probability for the specific gaming result 402), the specific gaming result will be forced 418 to occur and it's corresponding payout for that specific gaming result will be awarded 412 even though it may not have otherwise naturally occurred 410. If the player wants to continue with a new gaming event 414, the process returns to block 404 where the forced probability is again considered, otherwise the process ends 416.

In this manner, a forced probability that is more likely than the natural probability of a specific gaming event outcome may be employed to enable that specific gaining event outcome to occur more frequently than it otherwise would. Similarly, a forced probability that is less likely (or equal) than the natural probability of a specific gaining event outcome may also be employed to enable that specific gaming event outcome to occur more frequently than it otherwise would, as any additional chances from the random event relative to the natural probability of the specific gaming event outcome can increase the overall probability of obtaining the payout for that specific gaming result. As previously indicated, the specific gaming event outcome may be a particular symbol, a particular symbol combination, a part particular combination in addition to occurrence of another play features such as a payout modifier (e.g., multiplier) or bonus feature, etc.

Figure 5:
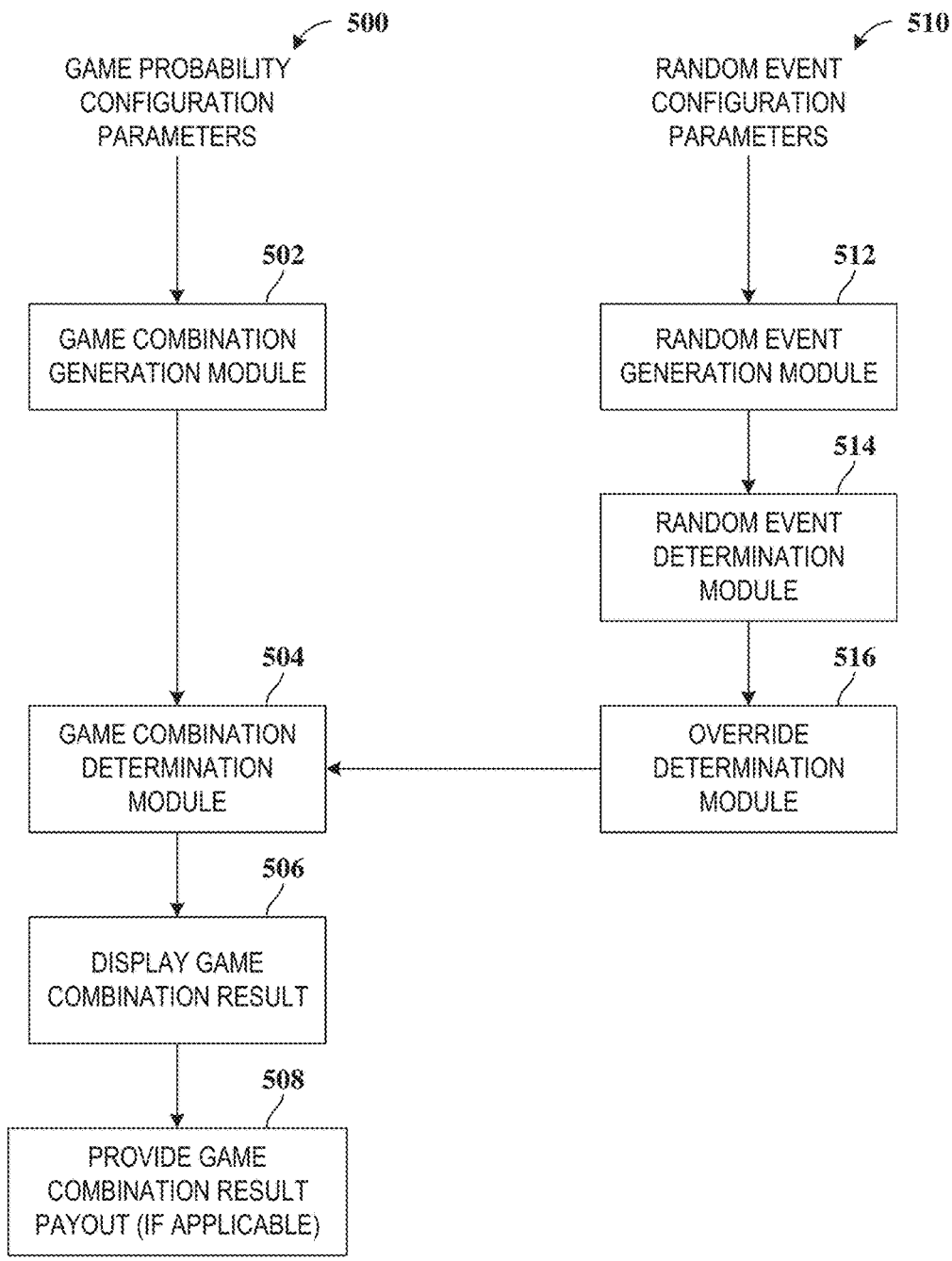
FIG. 5 depicts an embodiment where a processing arrangement is programmed to provide various modules for performing the gaming result override functions described herein.

The representative embodiment of FIG. 4 and other embodiments described herein may be implemented using processing hardware, storage, software, etc. FIG. 5 depicts an embodiment where a processing arrangement (which is intended to include single processors, multiple processors, or any other processing arrangement) is programmed with software and/or firmware to provide various modules to perform functions described herein. In the representative example of FIG. 5, game probability configuration parameters 500 are input into a game combination generation module 502. The game probability configuration parameters 500 represent, for example, the variables that impact the probability of a particular game combination result occurring. For example, in the context of a slot game, the game probability configuration parameters 500 may represent the number of reels, number of symbols per reel, number of particular symbols associated with the game combination result on the reels (e.g., number of star symbols on the reels), etc. These variables provide a natural probability of occurrence of any of the game combination results associated with that gaming event.

The game combination generation module 502 may represent the software-programmed or otherwise configured hardware to specify a given one or more game combination results, such as slot game reels that are randomly positioned to provide game combination results. The game combination determination module 504 represents the module that randomly selects an outcome, such as a symbol combination on one or more paylines of a plurality of slot game reels. Under normal circumstances, the game combination determination module 504 provides game results regardless of the type of gaming event played, such as a slot game reel spin, poker hand, roulette wheel spin, etc. Game combination results may be displayed 506, and game combination result payouts may be provided 508, if applicable.

An independent process also occurs to determine whether a particular game combination result should be forced to occur, or made more likely to occur, before it would naturally occur. In the representative example of FIG. 5, random event configuration parameters 510 are input into a random event generation module 512. The random event configuration parameters 510 represent, for example, the variables that impact the probability of the random event occurring. For example, the random event configuration parameters 510 may represent a number or a range of numbers, such as numbers 1-500,000 or other manner of identifying the desired forced or enhanced probability. The random event generation module 512 represents the functionality to enable at least one of the random items to be identified, such as a random number generator, look-up table with a desired number of randomly-selectable positions, virtual reel with a desired number of symbol locations, etc. The random event determination module 514 represents the functionality to actually select/identify a random event among the totality of available random events to select from. For example, the random event configuration parameters 510 may establish 500,000 total possibilities with one random event (e.g., number 127,209) representing the random event to enable overriding of the natural game combination outcome; the random event generation module 512 may represent a random number generator; and the random event determination module may select one of the 500,000 total possibilities to see if the particular one of the random events (e.g., number 127,209) occurs. In one embodiment, if that random event (e.g., random number) occurs, the override determination module 516 can override any result from the game combination determination module 504 to force a corresponding, predetermined one of the game combination results to occur. The game combination determination module 504 thereby identifies the forced, winning payout, and may then display 506 the forced game combination result and provide 508 the game combination payout.

Figure 6A:
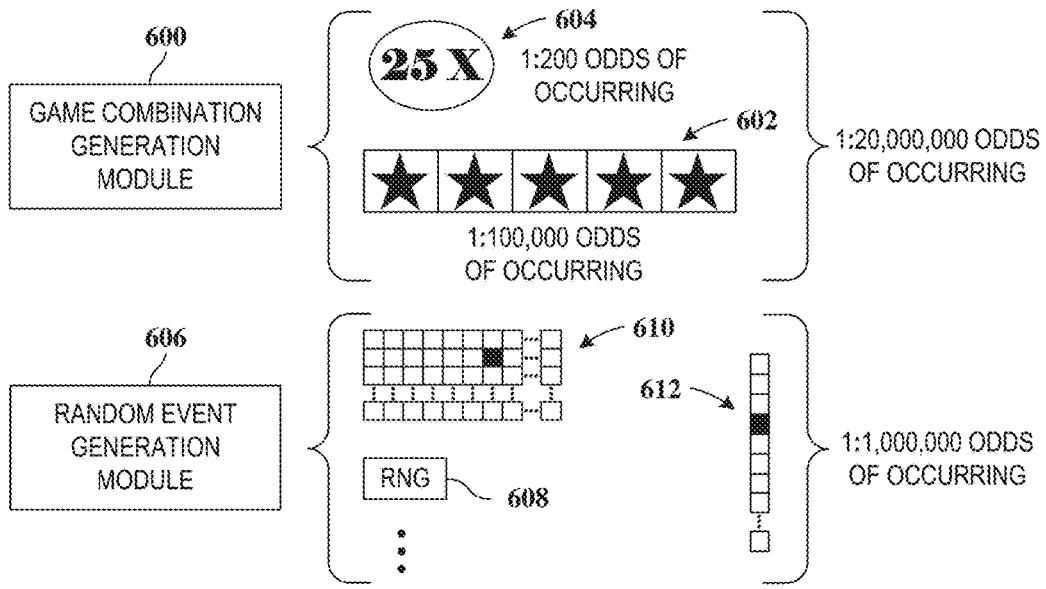
FIGS. 6A and 6B illustrate a representative embodiment of a gaming odds override feature in a slot game where an otherwise infrequent gaining result is statistically compelled to occur more often than the natural probability of that infrequent result would otherwise statistically warrant.
Figure 6B:
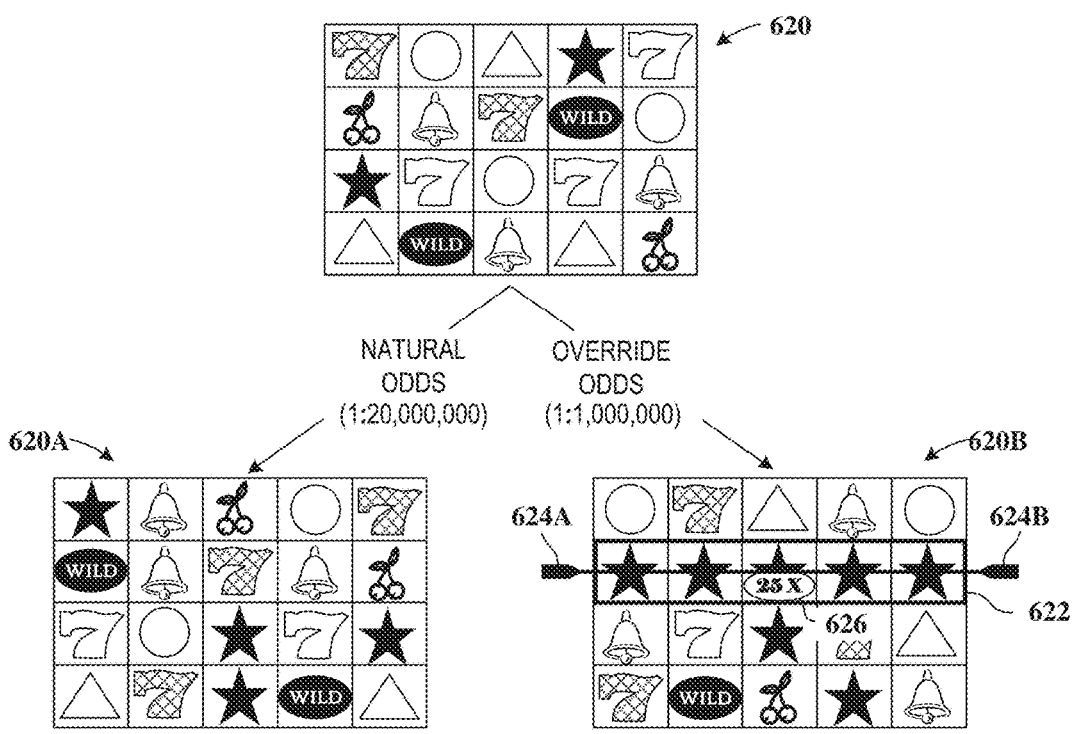

FIGS. 6A and 6B illustrate a representative embodiment of a gaming odds override feature in a slot game where an otherwise infrequent gaming result is statistically compelled to occur more often than the natural probability of that infrequent result would otherwise statistically warrant. In this embodiment, the game combination generation module 600 is configured to create game outcomes, ranging from statistically common game outcomes to statistically rare outcomes. These outcomes may be from a single event such as a symbol combination on a payline, or may be from multiple events such as both a symbol combination on a pay line and one or more additional payout enhancement features. In the example of FIG. 6A, the game combination generation module may represent a software-configured processor that randomly generates combinations of symbols, and also other features such as multipliers, free games, bonuses and/or other game enhancement features.

In the illustrated embodiment, the game combination generation module 600 is shown to statistically produce a series of five particular symbols on a payline 602, such as five star symbols, once in every 100,000 slot game reel spins. Additionally, a multiplier 604 may also be randomly provided, and in this example statistically does so once in every 200 reel spins. Such a combination may therefore only statistically occur once in every 20,000,000 reel spins, although it may generate a large payout award. If it is desired to have such a payout combination occur more frequently than their natural odds would allow, an overriding probability feature as described herein may be used. In the embodiment of FIG. 6A, a separate random event is processed, where the odds of the random event occurring differ from the odds of the particular game combination occurring (e.g., the symbol combination on payline 602 and the modifier/multiplier 604). In one embodiment, the odds associated with the random events can be the same as, or less than, the odds of the particular game combination occurring. In such a case, occurrence of the particular game combination might occur only slightly more often than the natural odds of the particular game combination (e.g., natural game combination may be 1:20,000,000, and odds of parallel random event being 1:20,000,000, making it twice as likely to occur since in one embodiment both random events are considered for each gaming event). In other embodiments, the random events have better odds of winning than the natural odds of the particular game combination, to allow the particular game combination to occur even more frequently.

In the embodiment of FIG. 6A, the random event generation module 606 generates a number of possible choices, and selection of one of those possible choices has a probability dependent on the number of possible choices. For example, a random number generator (RNG) 608 may be used to create random numbers that can be selected within some probability of selection. For example, random numbers may be used to identify contents of a lookup table 610, and a table location with a particular value can represent a "hit" meaning the random event occurred. A reel (e.g., virtual reel 612) can also be used to identify whether a random event occurred. Any desired manner of identifying the occurrence of a particular event within a number of potential events may be used in accordance with the description herein, and the examples of FIG. 6A are merely provided for purposes of illustration. In any event, in the example of FIG. 6A, the random event generation module 606 provides a statistical probability of occurring (e.g., 1:1,000,000) more often than the natural odds of the game combination occurring (e.g., 1:20,000,000).

As shown in FIG. 6B, the game combination generation nodule 600 and random event generation module 606 of FIG. 6A may be respectively used to provide a particular winning payout if the game combination occurs, and to provide that particular winning payout if a random event (which is more likely to occur) occurs. In this example, a slot game grid 620 is shown after a reel spin. For that spin or any other spin, the natural odds of a particular gaming outcome (e.g., symbol combination, or symbol combination plus modifier, etc.) are shown in FIG. 6B as one in 20 million. In accordance with the principles described herein, the odds of reaching that particular gaming outcome may be increased through the odds override functions described herein.

For purposes of example, assume that the occurrence of five star symbols on a payline and a 25× multiplier together provide a top award in a game. In the example of FIG. 6B, the slot game grid 620A is shown on a subsequent reel spin, where this particular winning outcome has not occurred with the 1:20,000,000 odds. The override odds are 1:1,000,000 in this example, and the slot game grid 620B depicts occurrence of this particular winning outcome when it did not occur through the normal gameplay resulting in slot game grid 620A. As shown on slot game grid 620B, five star symbols in a row of symbol locations or display segments 622 are formed along a payline extending from point 624A to 624B, and a 25× multiplier 626 is attributed to that payline 624A-624B. This illustrates that the override function as described herein can force a particular gaming outcome in response to occurrence of a random event that has a higher occurrence probability than the particular gaining outcome has in the gaming event.

Figures 7A, 7B:
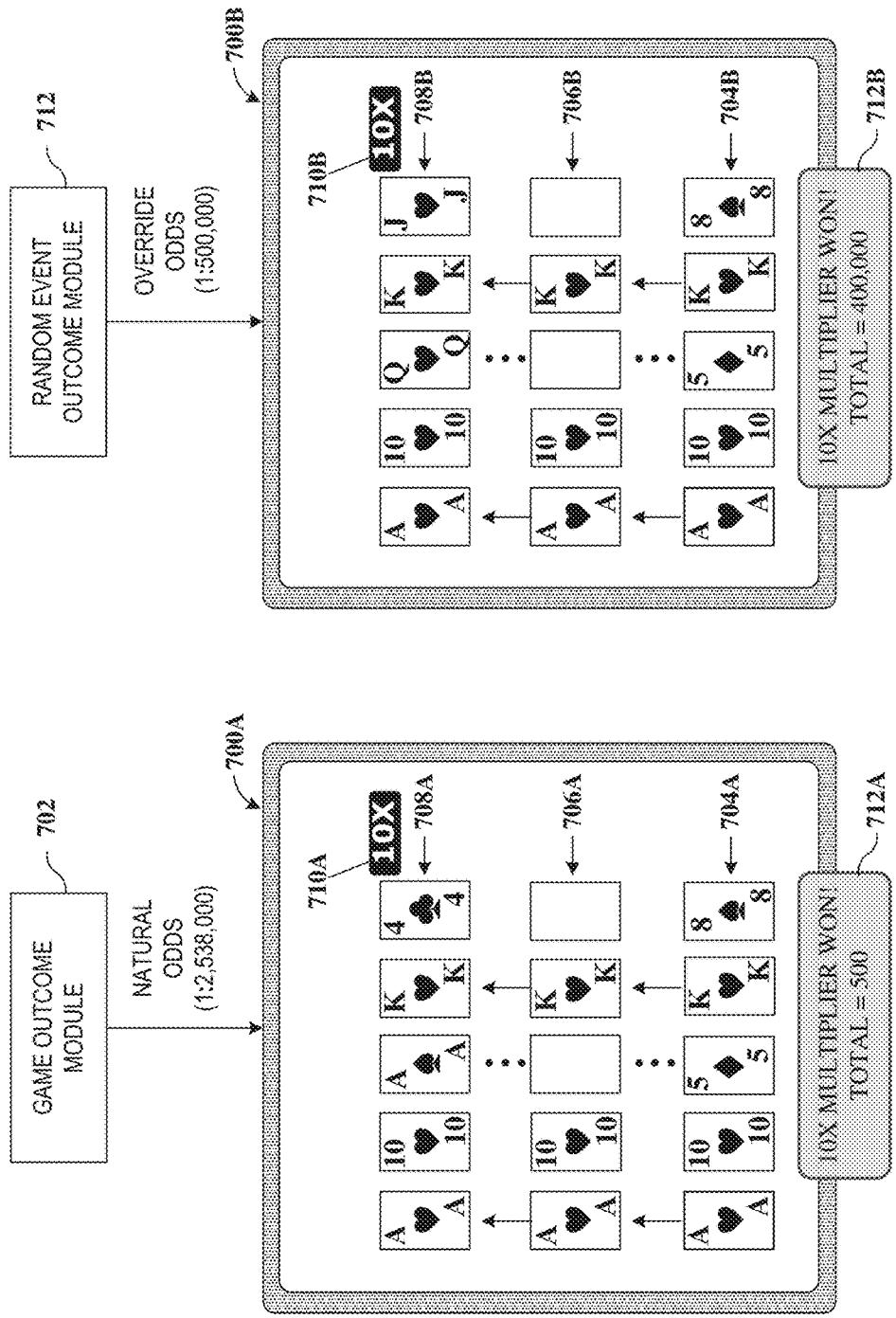
FIGS. 7A and 7B illustrate another representative embodiment of a poker game employing systems and methods for overriding the natural probability of a poker hand(s) outcome.

FIGS. 7A and 7B illustrate another representative embodiment of a game employing systems and methods for overriding the natural probability of a gaming event outcome. FIG. 7A depicts a representative draw poker game presented on a gaming display 700A. The game outcome module 702 may represent the software-programmed or otherwise configured hardware to specify a given one or more game combination results, such as poker hands, stud poker hands, hold-em poker hands, or any other card game hands. The game outcome module 702 may include the game probability configuration parameters such as the number of card decks, the number of each card in each deck, and/or other indicia on the cards. These variables provide a natural probability of occurrence of any of the game combination results associated with that card/gaming event. The game outcome module 702 also represents the game combination generation and determination functions which generates one or more card hands, and selects the original cards/hands, any replacement cards/hands (e.g., draw cards), etc. to produce game outcomes.

In the example of FIG. 7A, an original hand 704A is dealt, that by chance includes an Ace of Hearts (A-H), Ten of Hearts (10-H), Five of Diamonds (5-D), King of Hearts (K-H), and Eight of Spades (8-S). As this example is a draw poker embodiment, the player is allowed to retain or "hold" one or more cards of the original hand 704A. In this example, the player holds the A-H, T-H, and K-H, and discards the 5-D and 8-S as depicted at intermediate hand 706A, possibly hoping to obtain a royal flush. When the discarded cards are replaced to provide a final hand 708A, the best payout available for the cards of the final hand 708A are a pair of aces, including the A-H and an Ace of Spades (A-S), which is assumed to pay fifty (50) credits in this example. The player may also be randomly provided with a payout modifier (e.g., multiplier, other mathematical or fixed value increaser, etc.) or other game play enhancer (e.g., free plays, bonus play, etc.). In this example, a ten-times (10×) multiplier 710A is provided, which could be automatic based on the final hand 708A results, randomly provided, provided periodically, etc. Since the 10× multiplier 710A is associated with the final hand 708A that provided a payout (fifty credits in this example), the total payout in this example is 500 credits, as may be depicted via a display window 712A or anywhere else (and/or audibly) on the gaming device.

In this example, it is assumed that the likelihood of obtaining a royal flush on the final hand 708A plus obtaining the 10× multiplier 710A may be very low, which may be undesirable for a game designer who would like to see such a high reward payout occur more frequently. In accordance with the disclosure, such a high reward payout may be statistically forced to occur more frequently by establishing a random event that occurs at a more suitable frequency. In the example of FIG. 7B, a random event is established to occur approximately once in every 500,000 gaming events, where occurrence of this random event will override or supplant any result, or force the result without the original game determining a final hand 708A.

In the example of FIG. 7B, the gaming display 700B depicts what would happen if the override function indicates that a desired result (e.g., royal flush with 10× multiplier) is forced to occur. The random event outcome module 712 may represent the software-programmed or otherwise configured hardware to specify a given one or more random events of a number of possible choices that provides the desired override probability. The random event outcome module 712 also represents the random event generation and determination functions which makes the random selection to determine whether there is a hit on the override function. In this example, a random selection is made among 500,000 choices to determine when the override function will be utilized to force the corresponding desired result in the gaming event. For purposes of this example, it is assumed that the original hand 704B that is dealt is the same as the original hand 704A of FIG. 7A, thereby including the A-H, 10-H, 5-D, K-H, and 8-S. The player is allowed to hold one or more cards of the original hand 704B, and as previously described held the A-H, T-H, and K-H, while discarding the 5-D and 8-S as depicted at intermediate hand 706B. In this scenario, it is assumed that the random event occurred (with 1:500,000 odds in this example), thereby providing a royal flush in the final hand 708B with a 10× multiplier 710B.

As a result, the player wins the payout associated with a royal flush in the final hand 708B and a 10× multiplier 710B, which in this example is 400,000 credits as displayed via display window 712B. In this manner, the player is awarded this payout result in the scenario of FIG. 7B due to the override function that takes the place of what may otherwise have happened which is depicted in FIG. 7A.

In accordance with various embodiments, the override function may be implemented at desired stages of a gaming event. For example, in the context of a poker embodiment such as FIGS. 7A and 7B, the random event selection may occur in connection with the original hand 704B, thereby providing the player with a draw hand that would lead the player to hold cards towards a royal flush, and then provide the draw cards to that royal flush. In another embodiment, the original hand 704B may simply provide all five cards to the royal flush initially, thereby ensuring the player's ability to hold all five cards and obtain the desired final hand 708B.

In another embodiment, the random event selection may occur after the original hand 704B has been dealt. For example, if the original hand 704B is dealt, the random event may then be selected, and if the random event occurs, the final hand 708B with the royal flush and 10× multiplier 710B may be provided. Therefore, whether in a poker, slot game, roulette, keno, bingo, or other gaming embodiment, the random event used to provide the override function can be implemented at a desired stage of the gaming event with the mathematical probabilities and calculations adjusted accordingly.

In other embodiments, the poker game may not involve a draw feature. For example, another representative embodiment involves a stud poker game where a number of cards (e.g., five or seven) are dealt, in the player uses five of the dealt cards for the final hand. For example, in the case of five card stud poker, the player is dealt five cards, and the player uses those five cards as the final hand. The odds of obtaining a royal flush, for example, would be 1:649,740, and if the odds of obtaining the 10× multiplier was 1:100, the combined odds would be 1:64,974,000. An override function as described herein can enable such a result to occur more often than once in 64,974,000 attempts, and can be adjusted to be statistically right where the game designer would like it to be.

It should be noted that the override function described herein may be used in one, or any number of game results desired. For example, in the poker embodiments of FIGS. 7A and 7B, override functions may be provided for any one or more of royal flushes, straight flushes, four-of-a-kind (or certain subsets such as four Aces), combinations of poker hands and multipliers or other modifiers, etc. This holds true for any gaming activity described herein, including slots, roulette, bingo, keno, craps, or any other game of chance in which the gaming result can be statistically forced more often than its natural probability would otherwise dictate.

In another embodiment, cards (or other indicia in other games) that are held may be changed in accordance with the override features described herein. A particular final hand may be provided that changed one or more cards that were held. For example, if the player held the 5-D and 8-S in the embodiment of FIG. 7B, one variation of the override feature may change the final hand 708B to a particular hand (e.g., royal flush), thereby changing even one or more cards that were held by the player. While this may be provided randomly, it may also be associated with one or more conditions, such as a state of the original hand 704B. For example, the override feature may enable the random event to be considered for the final hand 708B where the original hand 704B has three cards dealt to the particular hand (e.g., royal flush). In such case, if the player had held the 5-D and 8-S when having three cards dealt to a royal flush, the random event may be implemented to determine if the player may be awarded that particular final hand 708B (e.g., royal flush) to essentially override a player's selection (which in some embodiments may be to override a player's "poor" selection).

The representative override functions described herein have generally been described in the context of forcing statistically different odds on obtaining a particular gaming result. For example, where the natural odds are 1:100,000, the override function may result in more favorable odds of obtaining that particular gaming result. In other embodiments, the override function may force or guarantee that the particular gaming result occurs within a certain number of gaming events. Therefore, rather than changing the odds to a more favorable probability, the system can ensure that the particular gaming result is forced within that probability.

For example, an override function may provide a random event to statistically occur once in every 10,000 attempts or gaming events, but it is still not guaranteed that the particular gaming result will occur within those 10,000 attempts. Instead of using a random event, one embodiment ensures that the particular gaming result will occur within those 10,000 attempts. For example, where the natural probability of a particular gaming result is a lower probability (e.g., 1:100,000), a counter or other event quantity tracking apparatus or module may be employed, and at the end of the count (e.g., 10,000), the particular gaming result may be forced. In another embodiment, the random events may result in forcing the particular gaming result within the 10,000 attempts if the random event occurs, but if it does not occur, a counter or other function will cause the particular gaming event to occur after the random event failed its statistical probability (e.g., the random event did not occur within the 9,999 attempts when the desired frequency of occurrence is once in every 10,000 attempts).

Figure 8:
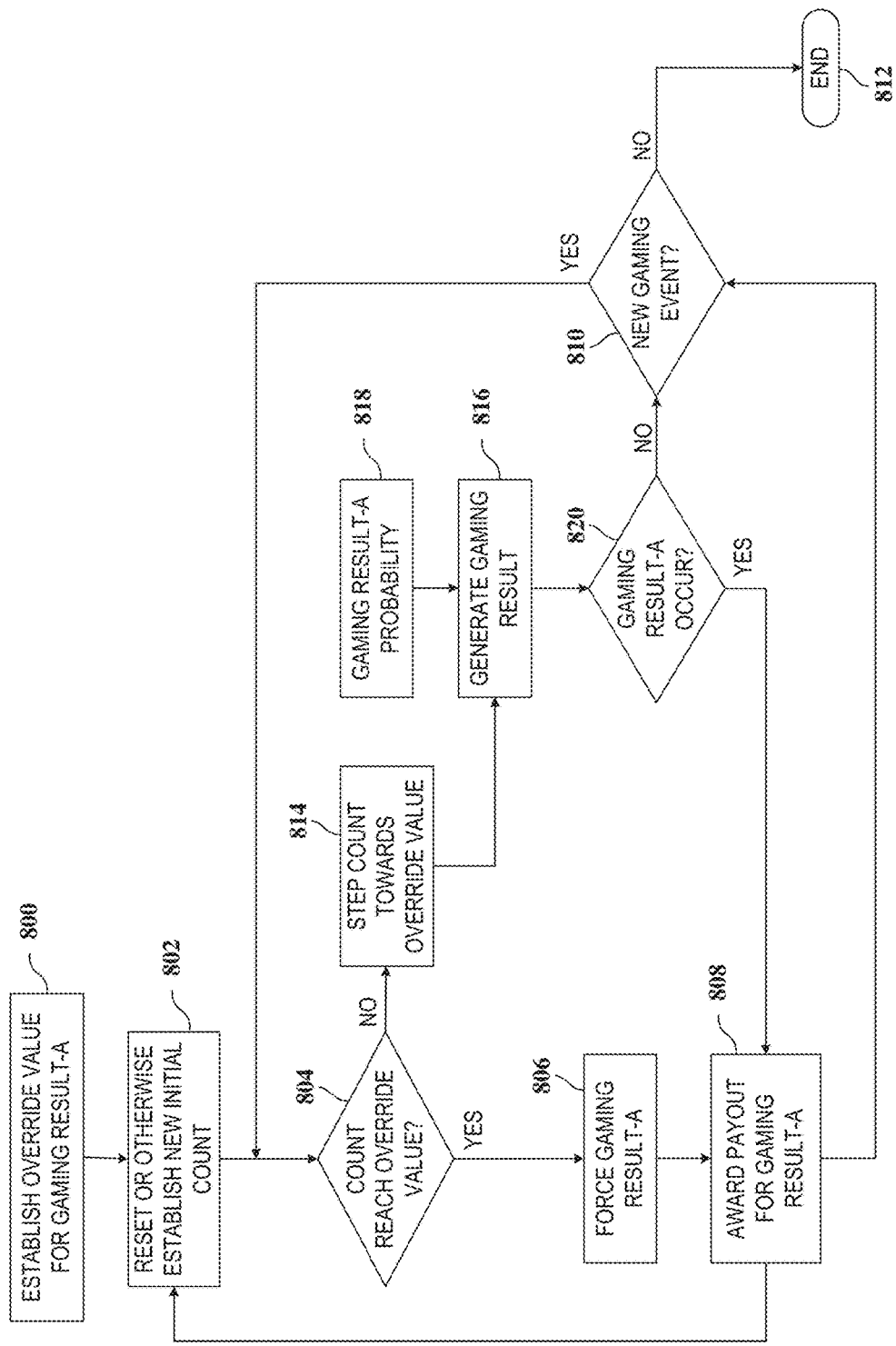
FIG. 8 is a flow diagram depicting a methodology for overriding the natural probability of occurrence of an event(s), and guaranteeing a particular gaming result(s) at least once in every set number of attempts.

FIG. 8 is a flow diagram depicting one such methodology for overriding the natural probability of occurrence of an event or multiple events, and guaranteeing a particular gaming result(s) at least once in every set number of attempts. An override value, such as a "count" value, is established 800 for a particular gaming result, referred to in this example as gaming result-A (e.g., a slot symbol combination(s); slot symbol combination(s) plus modifier(s)/bonus(es); poker hand; keno result; etc.). Establishing the override value determines the frequency in which the gaming result-A will occur. For example, if the override value or "count" is set to 1000, and the count reaches 1000, the gaining result-A will be forced to occur. The initial override value 802 is set or reset as shown at block 802, and may be reset to a known value (e.g., zero, set count, etc.), set to a random value, or otherwise established as a new initial count in any desired manner. If the count is established 800 to count 1000 gaming events (e.g., reel spins; poker hands; etc.), then the initial override value may be set to 1000 to force the gaming result-A when the count decrements (e.g., on each gaming event) to zero or other threshold condition. Alternatively, the initial override value may be set to zero, and counts up to force the gaming result-A when the count increments to 1000. Any manner of counting may be implemented.

In the embodiment of FIG. 8, when the count reaches the established override value as determined at block 804, the gaming result-A is forced 806. In other words, when a particular number of gaming events (e.g., reel spins) has occurred, the gaming event-A is forced to occur as if it had happened naturally during game play. A payout for the gaming result-A is awarded 808, and is the same payout amount as if the gaining result-A had occurred naturally, in one embodiment. The accounts may be reset 8022 enable the guaranteed override function to begin anew. Also, it may be determined 810 whether another new gaining event is initiated as determined at block 810. If not, the game play ends 812, where otherwise processing returns to determine 804 whether the count has reached its override value.

Where the count has not reached 804 its override value, the count is stepped 814 towards the established override value. For example, if the established override value is 10,000 and the system is counting upwards toward 10,000 the count will be incremented. Where the override function is not utilized, the natural results of the gaming activity are utilized. Particularly, a gaining result is generated 816, where the probability 818 of the particular gaming result-A is established based on the gaming parameters (e.g., in a slot context, the number of reels, number of symbols per reel, etc.). At block 820, it is determined whether the gaming result-A occurred naturally based on the established probability 818. If it did not occur, payouts for other results may be provided (or no payout at all), and the process ends 812 or returns to determine the count at block 804.

If gaming result-A did indeed occur naturally as determined at decision block 820, the payout for that gaining result-A is awarded 808. In one embodiment, natural occurrence of the gaming result-A will cause the initial count towards the override value to be reset 802, since there may be a lessened need/desire to force the gaming result-A to occur when it has already occurred naturally. In other embodiments, the process continues at decision block 810 without the parallel path back to resetting the initial count 802.

In one embodiment, a random event determination, such as described in connection with FIGS. 3-5, 6A-6B, 7A-7B and 8, may be performed in addition to the guaranteed override feature described in connection with FIG. 8. For example, for a particular gaining result having a natural probability of occurrence of 1:50,000, a random determination having a statistical probability of 1:10,000 may be implemented to expect the particular gaming result to statistically occur in 10,000 gaming events (or less, in embodiments where the particular gaming result occurs either naturally during the game or as a result of the random event determination; e.g., 1:10,000+1:50,000). If the particular gaming result does not occur at some point during the 10,000 gaming events (for example), a guaranteed override function such as that of FIG. 8 may be used to ensure that the particular gaming result occurs within the desired limit of gaining events (e.g., 10,000). In this manner, the particular gaining result would not occur precisely every 10,000 gaming events, but would occur at least once in every 10,000 gaming events. In another embodiment, the event would not be "forced" at the threshold limit (e.g., 10,000 gaming events), but rather would be set to have a high probability of occurring at or near the threshold limit.

It should be noted that embodiments of the guaranteed override functions will likely involve maintaining the count value through multiple game participants. For example, if the count value is 10,000, the count will be maintained through as many gaming participants as needed to reach the count value and force the desired gaming result, unless the count value is reset for other reasons (e.g., the desired gaming result occurred naturally, or occurred due to occurrence of the random event having a statistical probability more likely than the natural occurrence, etc.).

It should also be noted that the order of various functions described in the flowchart of FIG. 8 and elsewhere need not be in the precise sequence as depicted. For example, the generation of a gaming result 816 of FIG. 8 may occur in parallel with, or prior to, determining 804 whether the count has reached the override value. Or, alternatively, generation of the gaming result 816 may be dependent on the count not reaching the override value at block 804. Further, the time at which the count is stepped (i.e. incremented or decremented based on the start and end points of the count) is not of particular import to the overall methodology. These are merely depicted in an order for purposes of illustration of an embodiment, and those skilled in the art will readily appreciate that such ordering can be changed while providing the desired result of overriding a gaining result at a different frequency or periodicity than what the game naturally provides for.

Figure 9:
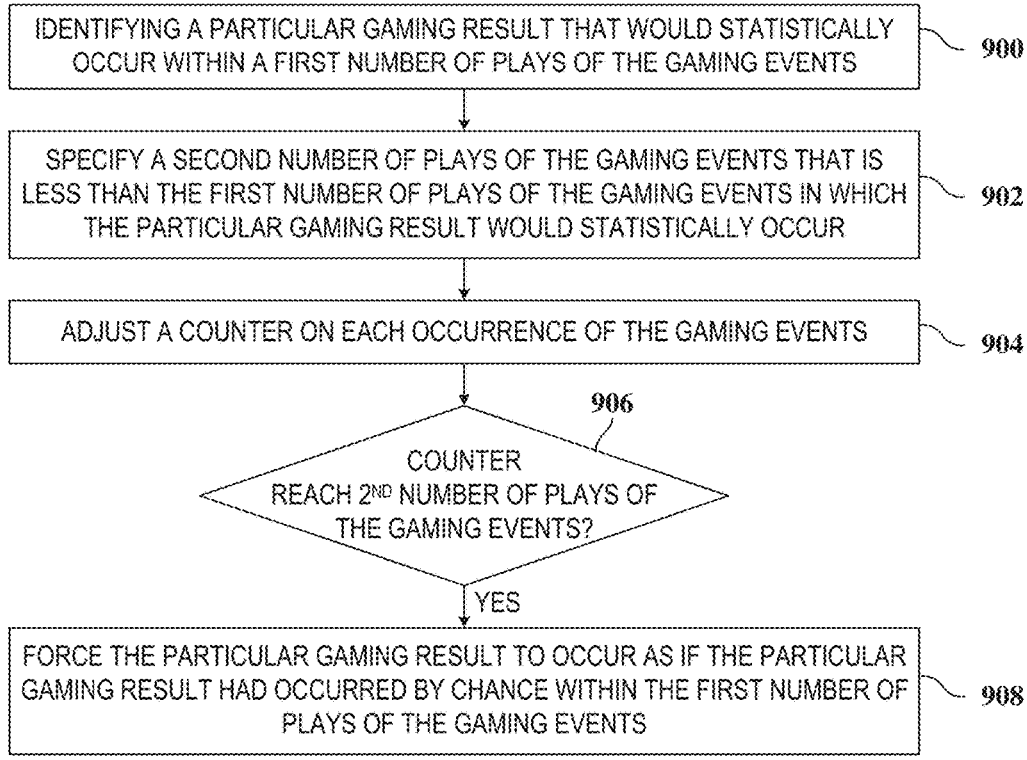
FIGS. 9 and 10 are flow diagrams depicting various embodiments for overriding the natural probability of occurrence of an event or multiple events, and guaranteeing a particular gaming result(s) at least once in every set number of attempts.

FIG. 9 is a flow diagram depicting another embodiment of a manner for overriding the natural probability of occurrence of an event or multiple events, and guaranteeing a particular gaining result(s) at least once in every set number of attempts. In this embodiment, a particular gaming result is identified 900 that would statistically occur within a first number of gaming event plays. A second number of gaining event plays is specified 902, where that second number of gaming event plays is less than the first number of plays in this embodiment. A counter is adjusted 904 on each occurrence of the gaming events, and when the counter reaches the second number of plays of the gaming events as determined at block 906, the particular gaming result is forced 908 to occur as if the particular gaining result had occurred by chance within the first number of plays of the gaming events. If the counter does not reach the second number of plays of the gaining events as determined at block 906, in one embodiment the counter is again adjusted 904 on the occurrence of the next gaming event. In other embodiments, the second number of plays specified 902 may be greater than the first number of plays.

Figure 10:
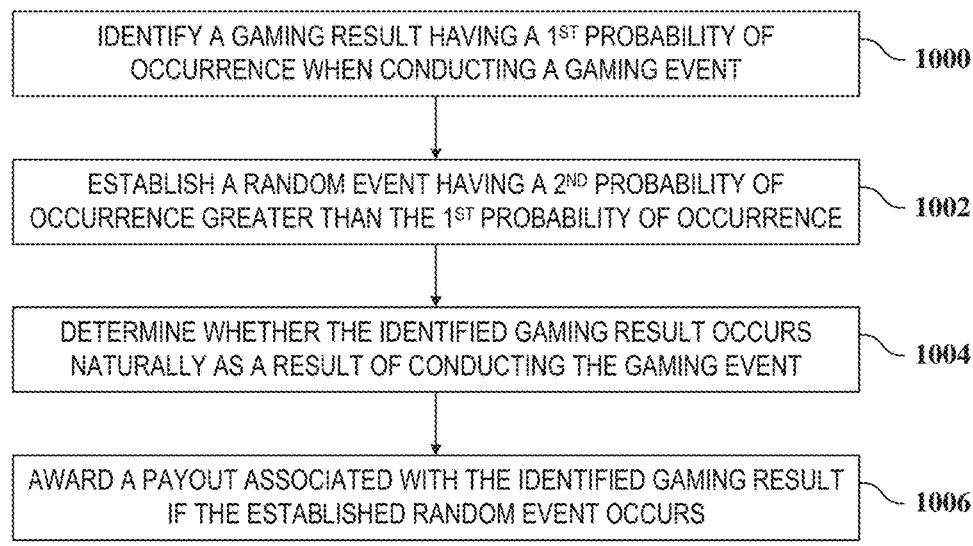

A further representative method that does not involve a guarantee is depicted in FIG. 10. In this example, a gaming result is identified 1000 that has a first probability of occurrence when conducting a gaming event. Additionally, a random event is established 1002 to have a second probability of occurrence that is greater than the first probability of occurrence. It is determined 1004 whether the identified gaming result occurs naturally as a result of conducting the gaining event, and a payout associated with the identified gaining result is awarded 1006 if the established random event occurs. In another embodiment, the payout associated with the identified gaming result is also awarded any time that the identified gaming result occurs naturally during participation in the gaming event.

In another embodiment, the random event is established 1002 having a second probability of occurrence that is not greater than the gaming result's first probability of occurrence. In such case, the overall probability of the payout being awarded is still increased, as any probability of the random event occurring adds to the probability of the gaming result's first probability of occurrence. Thus, the random event may be established 1002 to be any probability (whether greater than, less than, or equal to the first/natural probability) that results in the desired payout award 1006 probability when either the gaming result occurs at its first probability or the random event occurs at its second probability.

Figure 11:
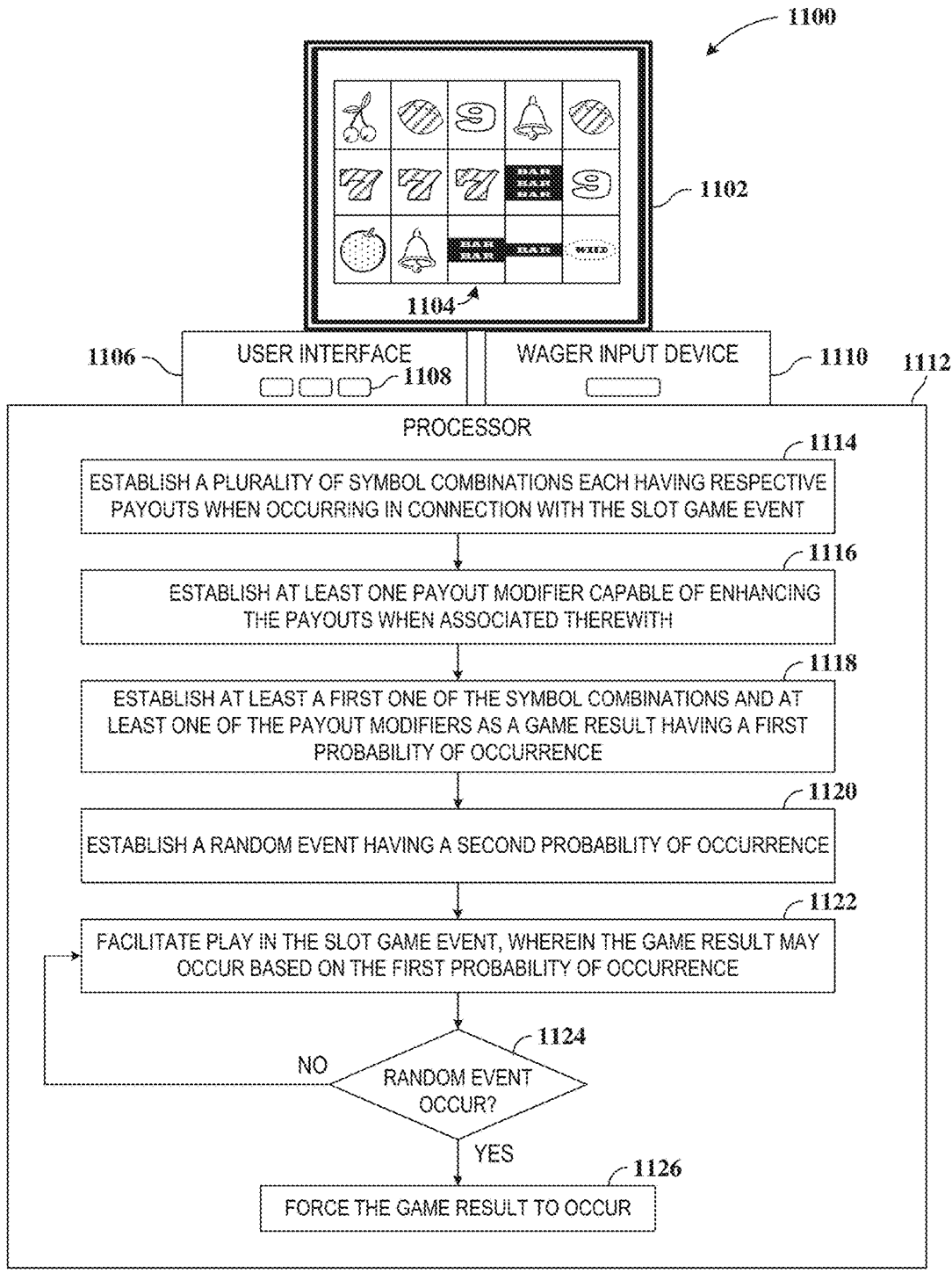
FIG. 11 is a block diagram of a representative slot game apparatus for overriding non-winning results in accordance with one embodiment.

A slot game embodiment for overriding non-winning results is shown in FIG. 11. A slot game device 1100 is provided on which players can play slot games. The representative slot game device includes at least a display 1102 presenting a slot game grid 1104, a user interface 1106 including at least one user input 1108 to enable a player to initiate a slot game event presented via the slot game grid, and a wager input device 1110 structured to identify and validate player assets and ultimately permit the player to play the slot game event when the player assets are provided. The slot game device 1100 also includes a processor 1112 configured to establish 1114 multiple symbol combinations that each have respective payouts when occurring in connection with the slot game event. At least one payout modifier is established 1116, where the payout modifier is capable of enhancing the payouts when it is associated with a payout. At least a first symbol combination and at least one of the payout modifiers are established 1118 as a game result that has a first probability of occurrence. An unrelated random event is also established 1120 that has a second probability of occurrence. In one embodiment, the random event is established 1120 such that the second probability of occurrence is greater than the first probability of occurrence, where in other embodiments the random event is established 1120 such that the second probability of occurrence is not greater than the first probability of occurrence. The representative method further includes determining 1124 whether the random event occurs in connection with the slot game event, and forcing 1126 the game result to occur if the random event occurs.

Figure 12:
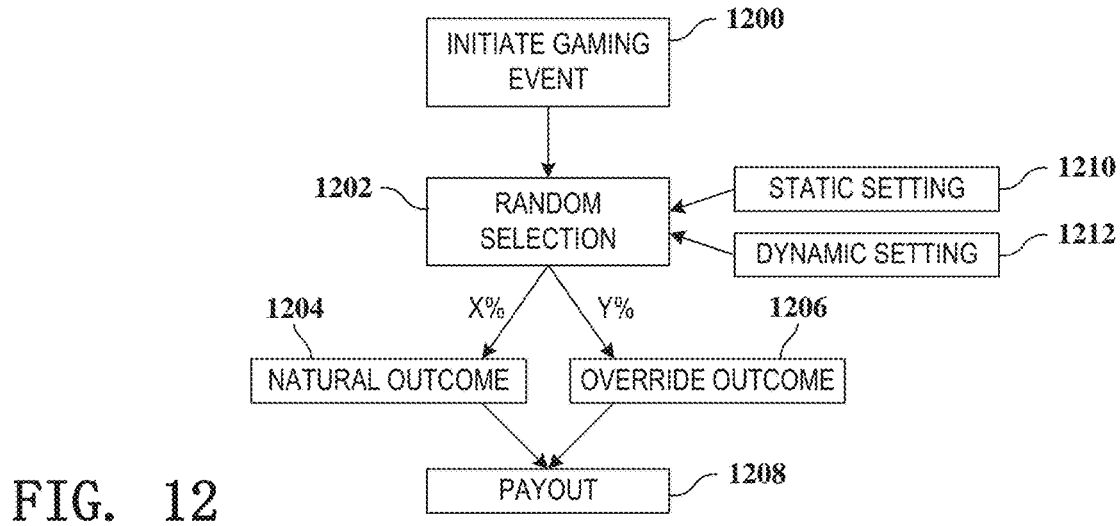
FIG. 12 depicts an embodiment where a random selection is made to either enable the natural outcome of a gaining event to occur, or to select from a table, bank or other repository of gaming event outcomes.

Another embodiment involves utilizing a random event as an override feature, but rather than randomly serving as the outcome, the random event randomly selects between the natural outcome and one or more predetermined outcomes. FIG. 12 depicts one such embodiment where a random selection is made to either enable the natural outcome of a gaming event to occur, or to select from a table, bank or other repository of gaming event outcomes. In the embodiment of FIG. 12, a gaming event is initiated 1200, such as physically or virtually spinning slot reels, dealing a poker hand(s), spinning a roulette wheel, identifying selected keno numbers, or any other start of a gaming event. A random selection 1202 takes place to randomly determine whether the gaming event natural outcome 1204 is allowed to occur, or whether an override outcome 1206 will be used instead of the natural outcome 1204 of the gaming event. For example, the random selection 1202 may be configured to enable the natural outcome 1204 to occur X % of the time, and to enable a predefined override outcome 1206 to occur Y % of the time.

In one embodiment, there may be just one override outcome 1206, such that the random selection 1202 selecting the override outcome 1206 Y % of the time will cause the single override outcome 1206 to be the gaming event outcome Y % of the time. In other embodiments, the override outcome 1206 represents a plurality of selectable, predefined gaming event outcomes. Therefore, when the random selection 1202 determines that the override outcome 1206 will occur Y % of the time, one of the plurality of selectable, predefined gaming event outcomes associated with the override outcomes 1206 will be selected. For example, the override outcomes 1206 may include a plurality of top awards, and/or other combinations such as a top award and a modifier (e.g., multiplier), etc. in this manner, the natural outcome 1204 can be overridden by the random selection 1202 and outcome selection within the override outcomes 1206. In either case, a payout 1208 may be provided in the event that the natural outcome 1204 resulted in a winning outcome, or in the event that the selected (or sole if only one) outcome associated with the override outcome 1206 has a payout 1208 associated therewith.

The weight associated with the random selection 1202 is, in one embodiment, adjustable. A static setting 1210 may be provided to set the random selection 1202 at a particular weighting of natural outcomes 1204 and override outcomes 1206. In other words, the static setting 1210 may enable the random selection 1202 to set the percentages, X % and Y %, in which the natural outcome 1204 and override outcome 1206 will be selected. As an example, the static setting 1210 may be set to cause the random selection 1202 to cause the natural outcome 1204 to be selected 99.9% of the time, while causing the override outcome 1206 to occur 0.1% of the time. Where there are multiple predefined gaming event outcomes associated with the override outcomes 1206, at least one of those predefined gaming event outcomes will be selected when the random selection 1202 allows the override outcome 1206 to be utilized. In one embodiment the allocation between natural outcomes and predefined outcomes is set, yet the setting may be adjusted to "re-set" the fixed allocation.

For example, assume there are ten different predefined outcomes associated with the override outcome 1206. In a slot game embodiment, a representative example of the ten predefined outcomes may include a top slot game award, such as the highest paying gaining event result associated with the game. One example might be a particular symbol combination occurring on a payline, together with a 10× multiplier. Other predefined slot game outcomes (e.g., symbol combinations, free spin awards, bonus events, etc.) may represent one or more of the other override outcomes 1206. In other embodiments, non-winning outcomes may also be associated with the override outcomes 1206, as is described in other embodiments below.

The weight associated with the random selection 1202 is, in another embodiment, dynamically adjustable during play of the game. A dynamic setting 1212 may be provided to set the random selection 1202 at a first weighting of natural outcomes 1204 and override outcomes 1206, which can change throughout play of multiple gaming events. In other words, the dynamic setting 1212 may enable the random selection 1202 to adjust and readjust the percentages X % and Y % during play. As an example, the dynamic setting 1212 may be set to cause the random selection 1202 to cause the natural outcome 1204 to be selected 99.9% of the time, while causing the override outcome 1206 to occur 0.1% of the time, for a first number of gaming events (e.g., first 100,000 spins of slot game reels; or after some passage of time; or after the payouts are statistically low to a threshold level; etc.). When some event or threshold occurs, the dynamic setting 1212 can cause the weighting between the X % and Y % to be readjusted, such as causing the override outcome 1206 to now occur 0.5% of the time. In one embodiment, the dynamic setting 1212 continues to cause the override outcome 1206 to increase in usage weighting relative to the natural outcome 1204 where the particular gaming event outcome(s) 1206 do not occur as a natural outcome 1204.

The weighting X %/Y % can continue to change to more heavily weight the override outcome 1206 until a desired condition occurs, such as the particular gaming event(s) has occurred either via a natural outcome 1204 or override outcome 1206. In other embodiments, the dynamic setting 1212 is not based on threshold levels, but rather the weighting is gradually and continuously adjusted (e.g., via an adjustment algorithm), such as on each gaming event (e.g., Y % changes from 0.112 to 0.113 to 0.114, etc. until it can even approach 100%). In one embodiment, the random selection 1202 to select the override outcome 1206 may be throttled when nearing 100% to always enable some chance for the particular gaming outcome(s) to occur naturally 1204.

Figure 13:
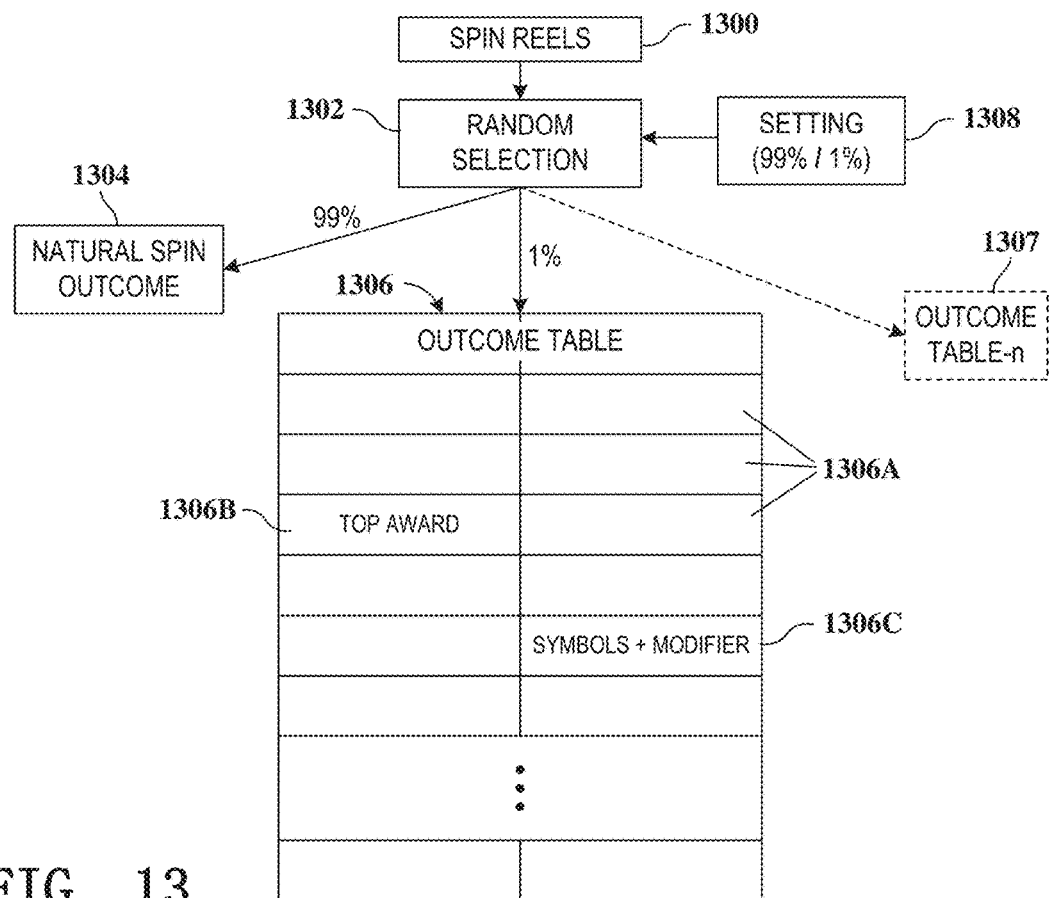
FIG. 13 illustrates another embodiment utilizing selection of a random event to determine, in a slot game context, whether a natural spin outcome or a predefined symbol combination will be used as the result of the particular gaming event.

FIG. 13 illustrates another embodiment utilizing selection of a random event to determine, in a slot game context, whether a natural spin outcome or a predefined symbol combination will be used as the result of the particular gaming event. The description of FIG. 13 is described in a particular order for purposes of illustration only, although certain events, such as spending the reels, need not occur in the particular order depicted.

In this representative embodiment, the gaming participant spins the reels 1300. This may be accomplished using the user interface on the gaming machine, gaming device, computing device, or other mechanism utilized by the participant to participate in the gaming activity. A random selection 1302 occurs in any desired fashion, whether using a random number generator, table of selectable items, etc. the random selection 1302 randomly selects between at least enabling the gaming event outcome to be governed by the natural spin outcome 1304 or an override outcome of gaining event outcomes (e.g., particular symbol combinations) depicted in this embodiment as the gaming event outcome table 1306. In some embodiments, there may be a random selection 1302 that includes one or more additional outcome tables, depicted as outcome table-n 1307. Such additional outcome tables 1307 may include one or more symbol combinations or other gaming outcomes with a desired occurrence probability. For example, the random selection 1302 may set the probability of utilizing the natural spin outcome 1304 at 97%, the probability of utilizing the outcome table 1306 at 2%, and the probability of utilizing the outcome table 1307 at 1%. These percentages are merely noted for purposes of illustration, as any probability allocation may be implemented as desired for selecting the natural spin outcome 1304 or one or more outcome tables 1306, 1307.

As described in connection with FIG. 12, embodiments involve enabling the random selection 1202 to be modified or adjusted as desired. The modification may be static, such that the selected probability allocations between natural spin outcomes and override outcomes remains substantially constant, or the selected probability allocations may be changed over the course of gaming activity play. This is depicted by the setting module 1308 of FIG. 13, which can be set to an allocation that satisfies the mathematical constraints of the particular slot game, or may be programmed or otherwise configured to change the probability allocations over time and/or over the course of a succession of gaming events. This particular example depicts the setting module 1308 as a fixed setting of utilizing the natural spin outcome 1304 approximately 99% of the time, and utilizing the outcome table 1306 approximately 1% of the time. This is merely for purposes of example, as any fixed allocation may be selected, and any dynamic allocation that changes over the course of the gaming activity may alternatively be selected.

In the illustrated embodiment of FIG. 13, the outcome table 1306 is depicted as a table from which predefined outcomes may be selected, although any manner of randomly selecting among a plurality of items may be used instead of a table. The outcome table 1306 may include any number of selection possibilities, depicted as selectable locations 1306A in the table 1306. One or more of the locations 1306A in outcome table 1306 may include any number of known symbol combinations such as a top award 1306B, and/or other gaming outcomes such as events providing bonuses, free plays, payout modifiers (e.g., multipliers), a particular symbol combination plus a particular modifier 1306C, etc. One or more of the available selections in the outcome table 1306 may be highly coveted gaming results, such as a top award 1306B (e.g., symbol combination on a payline with a high or highest payout), or may include winning results at any level. Further, some of the available selections in the outcome table 1306 may be blank, or non-winning outcomes. Using a random selection 1302 to allocate selection of result outcomes between the natural spin outcome 1304 and results from an outcome table 1306 (or other random selection methodology) provides for a greater degree of control for the probability of occurrence of any desired gaming outcome, particularly where that gaming outcome probability is desired to differ from the natural spin outcome 1304 for particular gaming outcomes.

An example of a gaming activity implementing an apparatus such as depicted in FIG. 13 is now described. A player may spin the reels 1300, such as by activating a spin button or other user interface mechanism. The system makes a random selection 1302, which for purpose of this example is assumed to select the natural spin outcome 1304 99.9% of the tune, and the outcome table 1306 0.1% of the time. Assume that a top award would occur via the natural spin outcome 1304 once in every 20 million spins, on average, but would occur once in every 2,000 selections from the outcome table 1306. If the top award is one of the 2,000 possibilities/locations 1306A, and where the outcome table is randomly selected 0.1% of the time (i.e., every 1,000 spins on average), then the chances of the top award occurring in this scenario are 1:20,000,000 when utilizing the natural spin outcome 1304, and 1:2,000,000 (one in 1000×2000) when utilizing the override outcome (outcome table 1306). As this depicts, the use of one or more outcome tables 1306, 1307 enables any desired gaming outcome to have a probability of occurrence that differs from the natural probability of occurrence of that gaming outcome. This allows certain gaming outcomes to override their respective natural probabilities of occurrence.

Figure 14A:
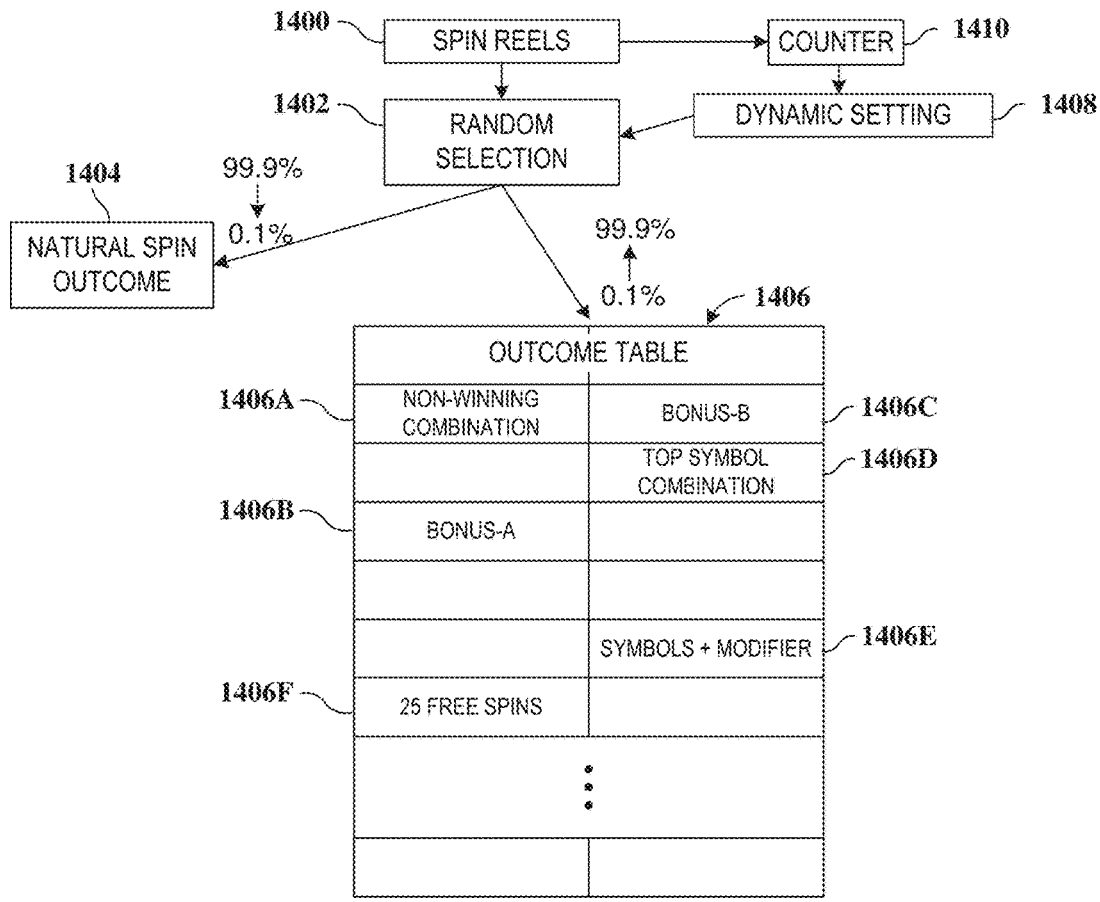
FIG. 14A depicts another example for utilizing random selection to determine, in a slot game context, whether a natural spin outcome or a bank of symbol combinations will be used as the result of the particular gaming event.
Figure 14B:
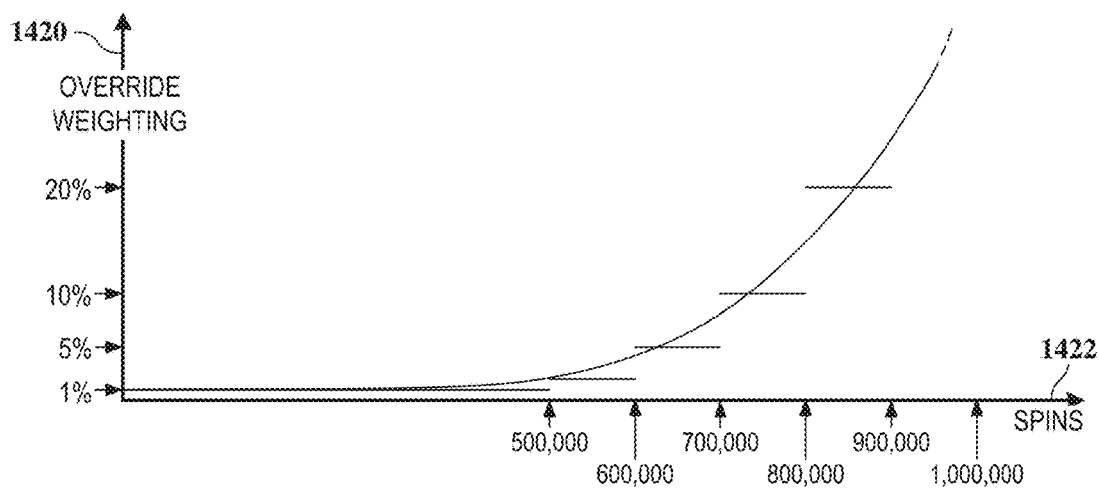
FIG. 14B depicts a representative dynamic weighting allocation between the natural gaming result outcome and an override outcome where the weighting towards the override outcome is increasingly more likely during continued play.

FIGS. 14A and 14B depict another example for utilizing random selection to determine, in a slot game context, whether a natural spin outcome or a bank of symbol combinations will be used as the result of the particular gaming event. The player spins the reels 1400, and a random selection 1402 chooses between utilizing the natural spin outcome 1404 or one or more results from an outcome table 1406. In this representative outcome table 1406, a number of representative selectable entries in the table are shown, such as an interesting combination(s), a non-winning combination(s) 1406A, one or more bonuses 1406B, 1406C, a top symbol combination(s) 1406D, combination(s) 1406E of symbol combination and payout modifier, free spins 1406F, and/or any other desired potential result of the particular gaming activity. The non-winning combination(s) 1406A may represent specific non-winning symbol combinations. Bonuses 1406B, 1406C may represent the symbol combination(s), scatter pays, random/mystery notification(s), and/or other outcome that would give rise to a bonus event, where a player may be allowed to play in an auxiliary gaming event to win awards and payouts. The top symbol combination(s) 1406D represents an award that may have a low statistical probability of occurring via a natural spin outcome 1404, yet is an award that would be highly coveted by a player. The symbols+modifier 1406E represents any combination of results, such as a particular symbol combination and a multiplier to further increase the payout for that particular symbol combination. The free spins 1406F represents any outcome that might provide the player with additional plays of the gaming events without having to provide additional player assets, or perhaps providing less player assets than would otherwise be required for such plays. These are merely representative types of outcomes that may be associated with an outcome table(s) 1406, yet the features described herein may be used with any type of outcome whether depicted in FIG. 14A or not.

In some embodiments, there may be as few as one defined outcome that is associated with the table 1406. The mathematical constraints of the system may be configured using non-winning results in the table 1406, and/or adjusting the weighting of the random selection 1402 with a static setting or a dynamic setting 1408. The example of FIG. 14A assumes a particular dynamic setting 1408, where the outcome table 1406 is more heavily weighted as play continues, and this weighting changes at predetermined (or in other embodiments, random) levels or plateaus. It should be noted that while this embodiment depicts changing the weighting at various threshold levels of game play, other embodiments do this more gradually, such as slightly changing the access percentage allocation to increasingly favor the outcome table 1406 over the natural spin outcome 1404 on each gaming event, or each nth gaming event, or every X minutes, etc.

In one embodiment, the dynamic setting 1408 changes with continued play of the gaming activity, and changes based on the number of gaining events played before reaching a particular outcome either via a natural spin outcome 1404 or via the outcome table 1406. In this embodiment, the dynamic setting 1408 changes the weighting allocation with continued play by utilizing a counter 1410. Therefore, as the player engages in gaming events (i.e. reel spins in this example), and each gaming event is counted to enable the dynamic setting 1408 to allocate and reallocate the weighting as play continues. In one embodiment, the counter 1410 is reset when a particular one, or when any particular ones, of the events from the outcome table 1406 occur (and in one embodiment, whether the events from the outcome table 1406 occur via a natural spin outcome 1404 or via the outcome table 1406).

The dynamic setting 1408 of FIG. 14A can be set to appropriate the weighting in any desired fashion. For purposes of illustration, the dynamic setting 1408 is assumed in this example to increase the weighting towards the outcome table 1406 during play such that results from the outcome table 1406 are increasingly more likely over time. In this depiction, the override weighting is shown on the Y-axis 1420, and the number of slot game spins (or other gaming events for other gaming activities) is shown on the X-axis 1422. In this example, the weighting is assumed to originally allow the natural spin outcome 1404 to occur approximately 99% of the time, and to originally allow the outcome table to be accessed approximately 1% of the time. In this embodiment, that weighting allocation occurs for the first 500,000 spins, at which time the next weighting level is invoked, which dynamically changes to a 98%-2% weighting of the use of natural spin outcomes 1404 to outcome table 1406 respectively. In this example, if the counter has not yet been reset due to reset rules (e.g., obtaining a particular one(s) of the outcomes in the outcome table 1406), the weighting continues to change to 95%-5% when 600,000 spins have occurred, 90%-10% when 700,000 spins have occurred, 80%-20% when 800,000 spins have occurred, etc. If it is desired to have a particular outcome(s) occur near 1,000,000 spins, for example, the weighing can by that time change substantially, such as to 1% use of natural spin outcomes 1404 and 99% of the outcome table 1406. For example, if the outcome table 1406 has only the top-paying symbol combination as a possibility among a number of non-winning results, the weighting can change near the desired occurrence point (e.g., approximately 1,000,000 spins, or 1,000,000 paylines played, etc.) to make it statistically probable that the desired outcome will occur in the very near future. In this manner, a desired outcome(s) can be made to occur, on average, within a desired number of spins.

The weighting of the natural gaming event outcome versus the use of the outcome table may be non-linear as shown in FIG. 14B, or may be non-linear in any mathematical function desired (e.g., it may oscillate to periodically change the weighting allocation, it may increase or decrease exponentially, it may increase or decrease logarithmically, etc.). Further, the weighting allocation may change linearly, such as linearly increasing the weighting to use the outcome table 1406. The weighting of the use of the outcome table 1406 versus using the natural result 1404 may increase, decrease, stay the same, oscillate periodically or non-periodically, or otherwise change as desired.

Figure 15:
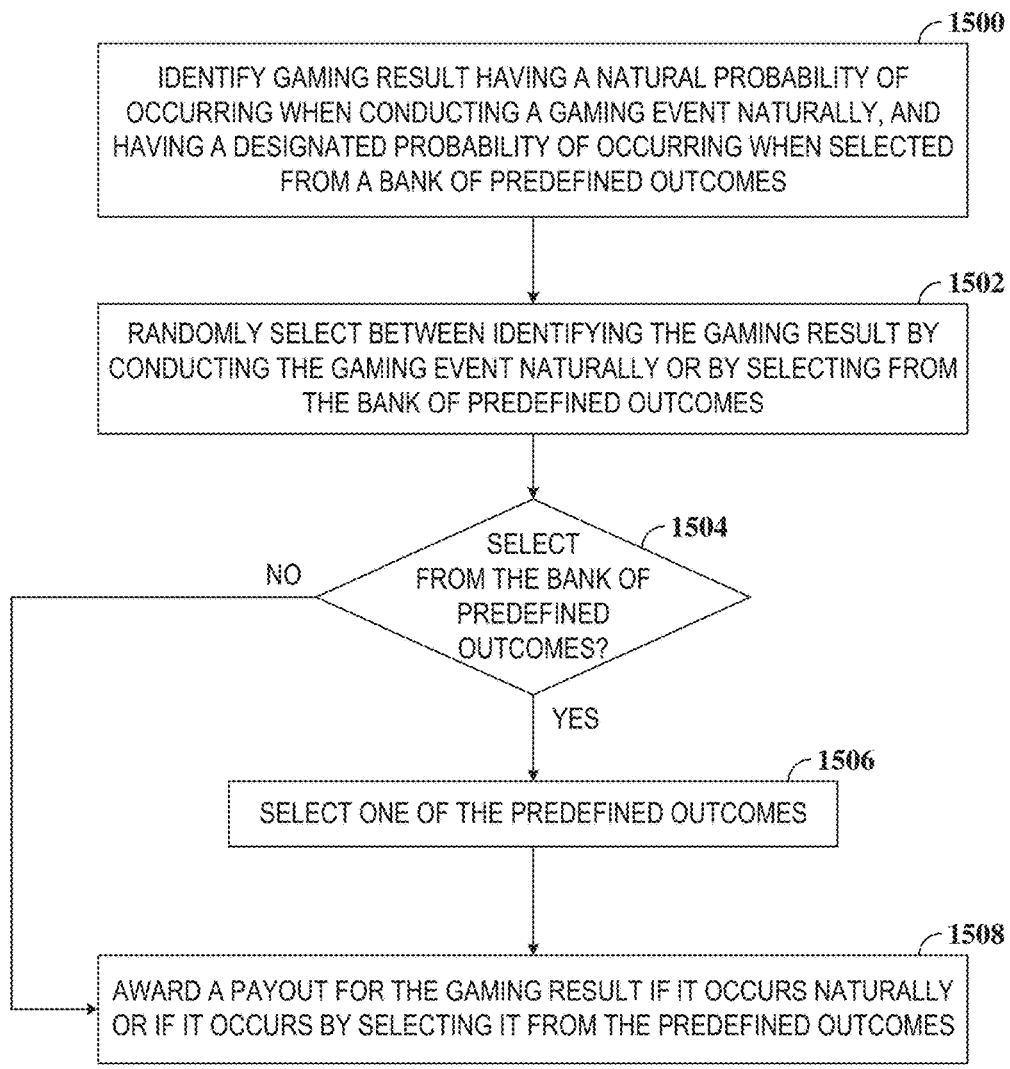
FIG. 15 is a flow diagram illustrating an embodiment for using a random event to randomly select between the natural outcome of a gaming event and a predetermined outcome for the gaming event.

FIG. 15 is a flow diagram illustrating an embodiment for using a random event to randomly select between the natural outcome of a gaming event and a predetermined outcome for the gaming event. At block 1500, the method involves identifying a gaming result having a natural probability of occurring when conducting a gaming event naturally, and having a designated probability of occurring when selected from a bank of predefined outcomes. The system randomly selects 1502 between identifying the gaming result by conducting the gaming event naturally or by selecting from the bank of predefined outcomes. It is determined 1504 weathered to select from the bank of predefined outcomes or to use the natural result of the gaming event. If the random event indicates to select from the bank of predefined outcomes, then one of the predefined outcomes is selected 1506. Otherwise, the natural result of that gaming event will be utilized. A payout is awarded 1508 for the gaming result if it occurs naturally or if that occurs by selecting it from the predefined outcomes.

The foregoing description of the representative embodiments has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of gaming activities that are capable of being played in a table version (e.g., machines involving poker or card games that could be played via table games).

Some embodiments have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out above.

What is claimed is:

1. A slot game device comprising:
   a display presenting a slot game grid;
   a user interface including at least one user input to enable a player to initiate a slot game event presented via the slot game grid;
   a wager input device structured to identify and validate player assets, and to permit the player to play the slot game event when the player assets are provided; and
   a processor configured to:
      identify a gaming result having a first probability of occurrence when conducting a gaming event;
      establish a random event having a second probability of occurrence;
      determine whether the identified gaming result occurs naturally as a result of conducting the gaming event; and
      award a payout associated with the identified gaming result if the established random event occurs.

2. The slot game device of claim 1, wherein the processor is further configured to award the payout associated with the identified gaming result if either the established random event occurs or the identified gaming result occurs naturally as a result of conducting the gaming event.

3. The slot game device of claim 1, wherein the processor is further configured to award the payout associated with the identified gaming result if the random event occurs before the identified gaming result occurs naturally.

4. The slot game device of claim 1, wherein the processor is configured to determine whether the identified gaming result occurs naturally by determining whether a predefined pattern of game indicia occurs as a result of conducting the gaining event.

5. The slot game device of claim 1, wherein the processor is configured to determine whether the identified gaming result occurs naturally by determining whether two or more independent gaming outcomes concurrently occur.

6. The slot game device of claim 1, wherein the processor is configured to determine whether two or more independent gaming outcomes concurrently occur by:
   determining whether a predefined pattern of game indicia occurs as a result of conducting the gaming event; and
   determining whether a payout modifier occurs as a result of conducting the gaming event.

7. The slot game device of claim 1, wherein the processor is configured to establish the random event to have the second probability of occurrence greater than the first probability of occurrence.

8. The slot game device of claim 1, wherein the processor is configured to:
   establish the random event such that the second probability of occurrence is not greater than the first probability of occurrence; and
   establish an overall probability of awarding the payout, based on either the gaming result or the random event occurring, that is greater than the first probability of the gaming result occurring.

9. The slot game device of claim 1, wherein the processor is configured to:
   establish a plurality of symbol combinations each having respective payouts when occurring in connection with the slot game event;
   establish at least one payout modifier capable of enhancing the awarded payouts when associated therewith;
   establish at least a first one of the symbol combinations and at least one of the payout modifiers as the identified gaming result having the first probability of occurrence;
   facilitate play in the slot game event, wherein the identified gaming result may occur naturally based on the first probability of occurrence;
   determine whether the random event occurs;
   force the identified gaming result to occur if the random event occurs; and
   award the payout associated with the identified gaming result if the identified gaming result occurs naturally or is forced to occur.

10. A gaming device comprising:
    a display to present one or more gaming events;
    a user interface including at least one user input to enable a player to initiate the gaming events;
    a wager input device structured to identify and validate player assets used to participate in the gaming events; and
    a processor configured to:
       identify a particular gaming result that would statistically occur within a first number of plays of the gaming events;
       specify a second number of plays of the gaming events that is less than the first number of plays of the gaming events in which the particular gaming result would statistically occur;
       adjust a counter on each occurrence of the gaming events; and
       when the counter reaches the second number of plays of the gaming events, force the particular gaming result to occur as if the particular gaming result had occurred by chance within the first number of plays of the gaming events.

11. The gaming device of claim 10, wherein the processor is further configured to:
    establish a random event that would statistically occur within a third number of plays of the gaming events, wherein the third number is less than the first number of plays of the gaming events;
    determine whether the random event occurs in connection with each of the gaming events; and
    if the random event occurs, force the particular gaming result to occur as if the particular gaining result had occurred by chance within the first number of plays of the gaining events.

12. The gaming device of claim 11, wherein the specified second number is equal to the third number of plays of the gaming events.

13. The gaming device of claim 11, wherein the particular gaming result is forced if either the counter reaches the second number of plays of the gaming events or if the random event occurs.

14. The gaming device of claim 10, wherein the processor is configured to adjust the counter by incrementing the counter towards a count value corresponding to the specified second number of plays each time another of the gaming events occurs.

15. The gaining device of claim 10, wherein the processor is configured to adjust the counter by decrementing the counter from a count value corresponding to the specified second number of plays each time another of the gaming events occurs.

16. The gaming device of claim 10, wherein the processor is configured to reset the counter in response to the particular gaming result being forced to occur.

17. The gaming device of claim 10, wherein the processor is configured to reset the counter in response to the particular gaming result occurring by chance within the first number of plays of the gaming events.

18. A gaming device comprising:
   a display to present one or more gaming events;
   a user interface including at least one user input to enable a player to initiate and participate in the gaming events;
   a wager input device structured to identify and validate player assets used to participate in the gaming events; and
   a processor configured to:
      identify a gaming result having a natural probability of occurring when conducting a gaming event naturally, and having a designated probability of occurring when selected from a bank of predefined outcomes;
      randomly select between identifying the gaming result by conducting the gaming event naturally or by selecting from the bank of predefined outcomes;
      if the random selection indicates to select from the bank of predefined outcomes, select one of the predefined outcomes from the bank of predefined outcomes; and
      award a payout associated with the identified gaming result if it occurs naturally, or if the random selection indicates to select from the bank of predefined outcomes and the identified gaming result is selected among the bank of predefined outcomes.

19. The gaming device of claim 18, wherein the processor is configured to randomly select between the gaming result by conducting the gaming event naturally or by selecting from the bank of predefined outcomes based on a fixed weighting.

20. The gaming device of claim 18, wherein the processor is configured to randomly select between the gaming result by conducting the gaining event naturally or by selecting from the bank of predefined outcomes based on a dynamic weighting that increasingly favors the selecting from the bank of predefined outcomes as the gaming events are played.

* * * * *